US008385200B2

United States Patent
Rainer et al.

(10) Patent No.: US 8,385,200 B2
(45) Date of Patent: Feb. 26, 2013

(54) WIRELESS NETWORK SELECTION MANAGEMENT

(75) Inventors: Brian Rainer, Lawrenceville, GA (US); Frederick J. Moulton, Issaquah, WA (US); Faith Taner Seiders, Hilton Head, SC (US); Tina R. Steeley, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 242 days.

(21) Appl. No.: 12/265,464

(22) Filed: Nov. 5, 2008

(65) Prior Publication Data

US 2010/0110890 A1 May 6, 2010

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........................ 370/232; 370/329
(58) Field of Classification Search .................. 370/232, 370/254, 466, 331
See application file for complete search history.

(56) References Cited

U.S. PATENT DOCUMENTS

| 6,192,055 | B1 * | 2/2001 | Rasanen ........................ 370/465 |
| 7,519,026 | B1 * | 4/2009 | Oh .................................. 370/331 |
| 2003/0231586 | A1 * | 12/2003 | Chheda .......................... 370/230 |
| 2007/0036132 | A1 * | 2/2007 | Armanino et al. ............. 370/352 |
| 2007/0054665 | A1 * | 3/2007 | Elkarat et al. .............. 455/432.1 |
| 2007/0129057 | A1 * | 6/2007 | Xu et al. ......................... 455/410 |
| 2008/0119199 | A1 * | 5/2008 | Hamano et al. ............... 455/455 |
| 2008/0126148 | A1 * | 5/2008 | Buco et al. ........................ 705/7 |
| 2008/0167033 | A1 * | 7/2008 | Beckers ...................... 455/432.3 |
| 2008/0287125 | A1 * | 11/2008 | Hind et al. .................. 455/432.1 |
| 2009/0109898 | A1 * | 4/2009 | Adams et al. ................. 370/328 |
| 2009/0180429 | A1 * | 7/2009 | Stevens et al. ................ 370/329 |
| 2010/0082436 | A1 * | 4/2010 | Maghoul et al. ........... 705/14.58 |

\* cited by examiner

Primary Examiner — Huy D Vu
Assistant Examiner — Adnan Baig
(74) Attorney, Agent, or Firm — Turocy & Watson, LLP

(57) ABSTRACT

Providing for network selection management for a mobile communication environment is provided herein. By way of example, the network selection can supersede default network selection configurations of a mobile terminal. Usage behaviors of mobile terminals can be monitored to gauge service demand for individual terminals. Based on the service demand, a particular network can be selected as a default for a terminal. The network selection can be utilized for load balancing terminals among suitable mobile networks, optimizing network resources, improving services for terminal devices, or the like.

20 Claims, 20 Drawing Sheets

WIRELESS NETWORK SELECTION MANAGEMENT

BACKGROUND

Mobile communication technology has made a profound impact on inter-personal communications. Whether for social or business purposes, never before have people had such an expanded ability to interact with each other. While traditional fixed line networks have provided a backbone for remote communications, the advent of mobility has enabled users to employ small, portable devices to effect such communications, while stationary or moving. Accordingly, inter-personal communication can be conducted not just indoors with a device coupled to a fixed power source and communication link, but with a portable handheld device while outdoors, driving in a car, or even flying in an airplane.

Rapid growth of the telecommunications industry has fueled a strong competition for market share in mobile-IP communication devices and communication service plans. Because of such competition, mobile network providers have created packet based data networks that can provide IP access to the Internet and other IP-based network resources and applications (e.g., e-mail, web browsing, and so on). Accordingly, a mobile handset or the like can provide access to a rich assortment of shared computing applications and data resources available via such networks. Further, the low cost, worldwide, personal voice communication traditionally available via mobile communication devices is also available on such mobile handset. In addition, mobile communication networks can generally interconnect with local landline services, providing the mobile handset with as much interconnectivity as traditional wire-based telephony and computing devices but with far greater user mobility and flexibility.

As the mobile communication market increases, the numbers of mobile subscribers increase, and the voice and data demands of such subscribers evolve and become more complex, the support networks provided by legacy voice and next generation data services must evolve as well. Higher speed data must be implemented as web-shared applications become more popular. Such higher speed data requires additional processing power, additional air bandwidth (e.g., between base stations and mobile devices), and additional bandwidth in network interfaces to popular data networks such as the Internet. Further, in certain mobile communication architectures such as code division multiple access (CDMA) and subsequent iterations of CDMA technology, providers look to share transmission resources among low demand but high quality voice traffic, and high demand data traffic, in order to share and maximize current bandwidth resources. Accordingly, network architectures must adapt as numbers of subscribers and demands of such subscribers increase and evolve.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject disclosure provides for network selection management for a mobile communication environment. The network selection can, in some circumstances, supersede default network selection configurations of the device (e.g., device manufacturer network selection specifications). Usage behaviors of mobile terminals can be monitored to gauge service demand for individual terminals. Based on the service demand, a particular network can be selected as a default for a terminal. The network selection can be utilized for load balancing terminals among suitable mobile networks, optimizing network resources, improving services for terminal devices, or the like.

To illustrate network selection, terminals primarily or exclusively employing circuit-switched voice communication can be directed to relatively low data rate, circuit-switched networks. On the other hand, terminals primarily or exclusively employing data services can be directed to relatively high data rate circuit/packet switched networks, or high data all packet-switched networks. Thus, overall mobile efficiency can be improved by directing terminals to networks that provide services closely matched to terminal usage patterns.

Various business algorithms are provided herein to determine whether a terminal is suited for network selection. The algorithms can account for device-related capabilities, including handset hardware and software configurations as well as subscriber identity module (SIM) card capabilities. As an example, a device's ability to connect to circuit-switched and packet-switched networks can be considered by such algorithms. Other considerations can include data services employed by the device, network capabilities, relative network load, a user profile and user preferences, a subscriber account or rate plan associated with a terminal, customer service settings, and so on. These as well as like factors can be utilized in determining whether the terminal is suited for network selection.

If a device is suited for network selection, device usage behavior is monitored to determine a most appropriate network for the device, optionally considering dynamic factors such as network loading. A selected network is established as a default network for the device. Accordingly, such device will connect to the default network before connecting to other available networks.

In addition to the foregoing, the subject disclosure can adapt to changes in usage patterns and update network selection based on such changes. Once a network is selected for a device, a re-evaluation period can be initiated, where data/service usage of the device is again monitored. If the usage rises above a minimum threshold (e.g., a minimum data rate, an average, mean or median data rate or other suitable statistical determination), or a new service plan or type of service is added to a rate plan during the re-evaluation period, network selection can be updated for the device. Otherwise, the selected default network can be maintained for the device.

According to particular aspects of the subject disclosure, user rate plans can be established or adjusted based on network selection management. For instance, users that participate in network-directed selection management can be provided a discount to a rate plan, or users that do not participate in the management can have a premium added to a rate plan, or both. In still other aspects, a network that is lightly loaded can be established as a preferred network for network selection management. Users selected for the preferred, lightly loaded network (e.g., a conventional 2G network) based on data usage can be provided an additional incentive, such as a reduction in rate plan, free or reduced rate services compatible with the preferred network, and so on, to increase utilization of the lightly loaded network (and, in some cases, reduce loading of an over loaded network). Accordingly, subscribers can be given incentives to adapt mobile usage patterns in a manner that optimizes network resource utilization.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
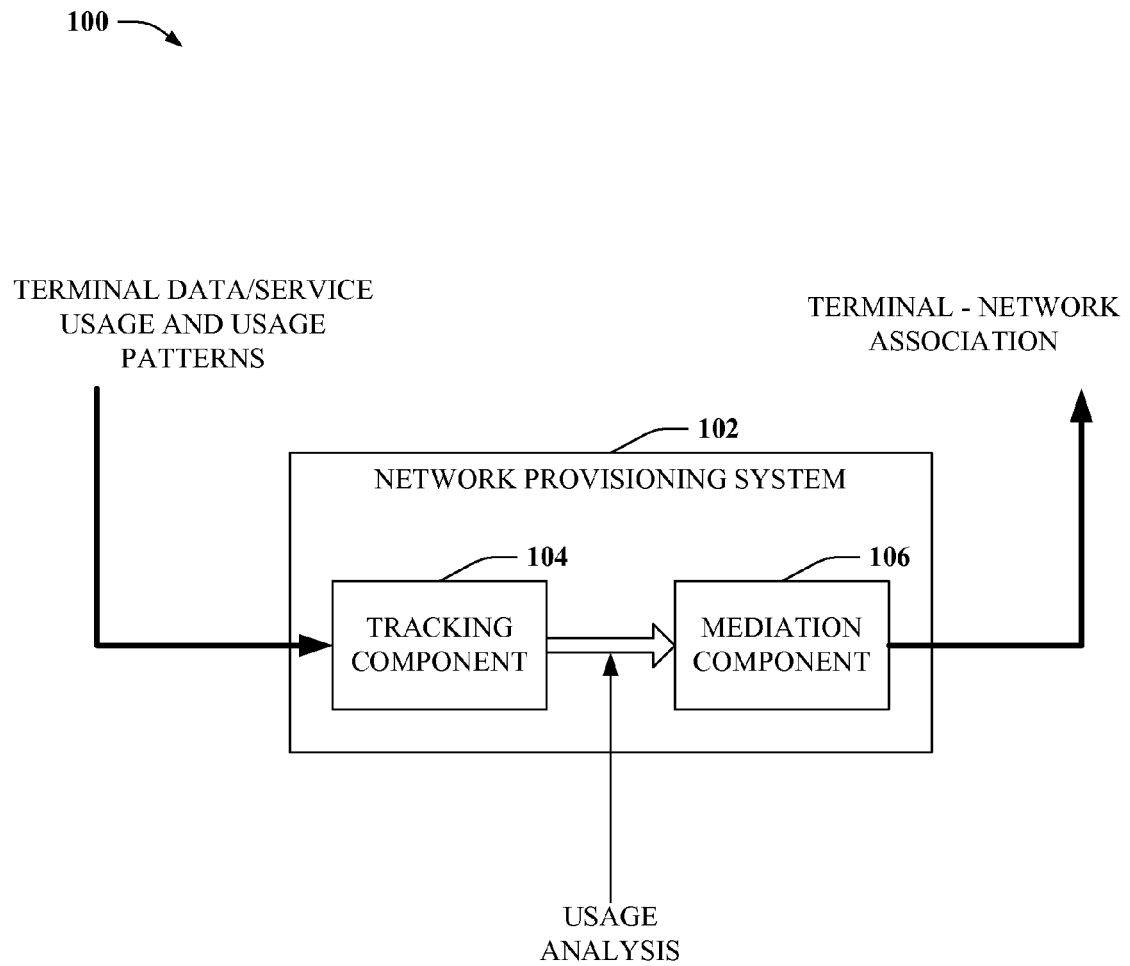
FIG. 1 illustrates a block diagram of an example system that provides network selection management according to aspects of the subject disclosure.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", "engine", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components, and can be as simple as a command line or a more complex Integrated Development Environment (IDE).

As mobile devices become more advanced and have the ability to connect with various types of networks, network selection becomes an important part of device functionality. Dual-mode and multi-mode phones are configured with logic to identify surrounding networks and select among the networks based on various conditions, such as relative signal strength, relative bandwidth or throughput and the like. Typically, selection does not include network loading, however, as a mobile terminal is generally unable to observe nearby terminal traffic. Rather, a multi-mode device bases network selection on relative observations made at the device.

Whereas a mobile terminal typically does not observe nearby terminal traffic, a network serving the terminals can observe such traffic. Accordingly, the network can collect and maintain network load data and compare that data with network capacity. Furthermore, the network can obtain device-specific information from specific terminals, or from profile information stored at a network database (e.g., visitor location registry [VLR], home location registry [HLR], or other suitable network database). Accordingly, the network can be a more appropriate arbiter of network selection, as network conditions as well as terminal capabilities and subscriber preferences can be obtained/stored by the network and employed in network selection.

Aspects of the subject disclosure provide control of network selection capabilities for mobile terminals in the presence of multiple wireless networks. Network selection can be based on terminal-specific information as well as network-specific information. For instance, the terminal or a subscriber profile maintained by a network operator can be queried to identify networks the terminal is compatible with. Network information, maintained at network servers and/or databases, can include networks within a particular region, network load, and the like. Such networks can include licensed spectrum networks, including second generation (2G) circuit-switched networks (e.g., Global System for Mobile communication [GSM], Code Division Multiple Access [CDMA] Interim Standard 95 [IS-95], and so on), third generation (3G) circuit/packet switched networks (e.g., Universal Mobile Telecommunications System [UMTS], Wideband CDMA [W-CDMA], and so forth), combined circuit/packet switched networks (e.g., a 2G/3G network such as General Packet Radio Service [GPRS] or GPRS Enhanced Data rate for Global Evolution [EDGE]) or fourth generation (4G) networks (e.g., Worldwide interoperability for Microwave Access [WiMAX]) and beyond. Furthermore, network selection can also include non-licensed wireless data networks, such as WiFi networks (e.g., 802.11a, b, g, n, etc.), Bluetooth® networks, and the like.

According to other aspects, network selection parameters can be sent over-the-air (OTA) to a subscriber identity module (SIM) device (e.g., mobile terminal). The device can employ the parameters in subsequent network selection. As a particular example to illustrate the foregoing, a parameter can set a 2G GSM network as a default network for the device. Accordingly, the device can utilize the parameter in subsequent network selection processes, to select a 2G GSM network over other available networks.

Network selection can be implemented based on business logic that employs provisioning, billing and network elements with input from subscriber account profiles, remote communication features, terminal and SIM capabilities, rate plans, account types or subscriber group types, or the like, or a combination thereof. Changes in subscriber settings can further be based on terminal location, use of network capability-based features, use of voice or data services, roaming service and status, and so on. Change in these settings can occur based on account configuration changes or dynamic usage inputs from elements of a communication system, or both. Dynamic changes to a terminal or SIM can also be incorporated into network selection business logic. Accordingly, network selection can determine an optimal process for distributing traffic among available wireless networks, considering capacity and load of such networks, as well as service features and usage history of subscriber rate plans and accounts, providing a balanced and efficient operating environment.

It should be appreciated that, as described herein, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). The aforementioned carrier wave, in conjunction with transmission or reception hardware and/or software, can also provide control of a computer to implement the disclosed subject matter. Of course, many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the amended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Turning now to the drawings, FIG. 1 depicts a block diagram of an example system 100 that provides network selection in a mobile environment. System 100 can comprise a network provisioning system 102 that obtains data pertinent to individual mobile terminals (not depicted) and data pertinent to available networks and provides a network selection result for each terminal. The network selection result can comprise, in some aspects disclosed herein, a parameter indicating at least one network or type of network (e.g., 2G, 3G, cellular, WiFi, etc.) as a default for terminal-initiated network selection (e.g., stored on a SIM card). Terminal-related information utilized for network selection can comprise access capabilities of a terminal or an associated SIM card, what networks the terminal is capable of accessing, features, rate plans, or account services that rely on a particular network versus availability of such network, customer service and/or user preference settings, and the like. Suitable network information can comprise identity and type of available networks versus access capabilities of the terminal, whether a regional market supports network selection, traffic of the available networks, and so forth.

Based on terminal capabilities and preferences, and network availability, network provisioning system 102 can first determine whether a terminal is eligible for network selection. If so, network provisioning system 102 can then begin monitoring data usage of the terminal. Tracking component 104 can observe mobile network usage over a threshold period to determine usage for that period. As an example, tracking component 104 can monitor the terminal's data usage (e.g., measured in kilobytes per second [KB/s], total KB exchanged, average KB/s, etc.) to determine a user's propensity to employ data-related services. As another example, tracking component 104 can monitor utilization of voice services employed by the terminal to measure a user's calling traffic. In other examples, tracking component 104 can monitor call-related data services (e.g., streaming audio or video, voice over Internet Protocol [VoIP], and so on) to determine a user's propensity to employ such services. Once the period expires, an analysis of the user's usage patterns for the period are provided to mediation component 106 to determine, if network selection is available, a result of the selection.

If network selection is available for a particular mobile terminal within a particular location, mediation component 106 can select a network as a default for the mobile terminal, or alter/override a default network determined by manufacturer defaults. Based at least on the network usage analysis during the monitoring period, and access capabilities of a mobile terminal, mediation component 106 can select a network as a default for the mobile terminal. The selection can be output from the network provisioning system 102 to network components, such as billing, OTA provisioning, switch control, roaming selection, and so on.

According to some aspects of the subject disclosure, the output selection can be stored in a component of a mobile network (not depicted) as a network setting, or N-Set value, for the mobile terminal. According to particular such aspects, the N-Set value(s) can be stored and implemented at an OTA provisioning platform (e.g., see FIG. 4, infra), which employs radio access networks (RANs) to exchange data with the mobile terminal. The OTA provisioning platform can forward the N-Set value or related parameters to the mobile terminal, e.g., in an OTA application. Such an OTA application can be configured to store the selected network as a default network or instructions for selecting the selected network in a SIM card, or other suitable location, on the mobile device.

Figure 2:
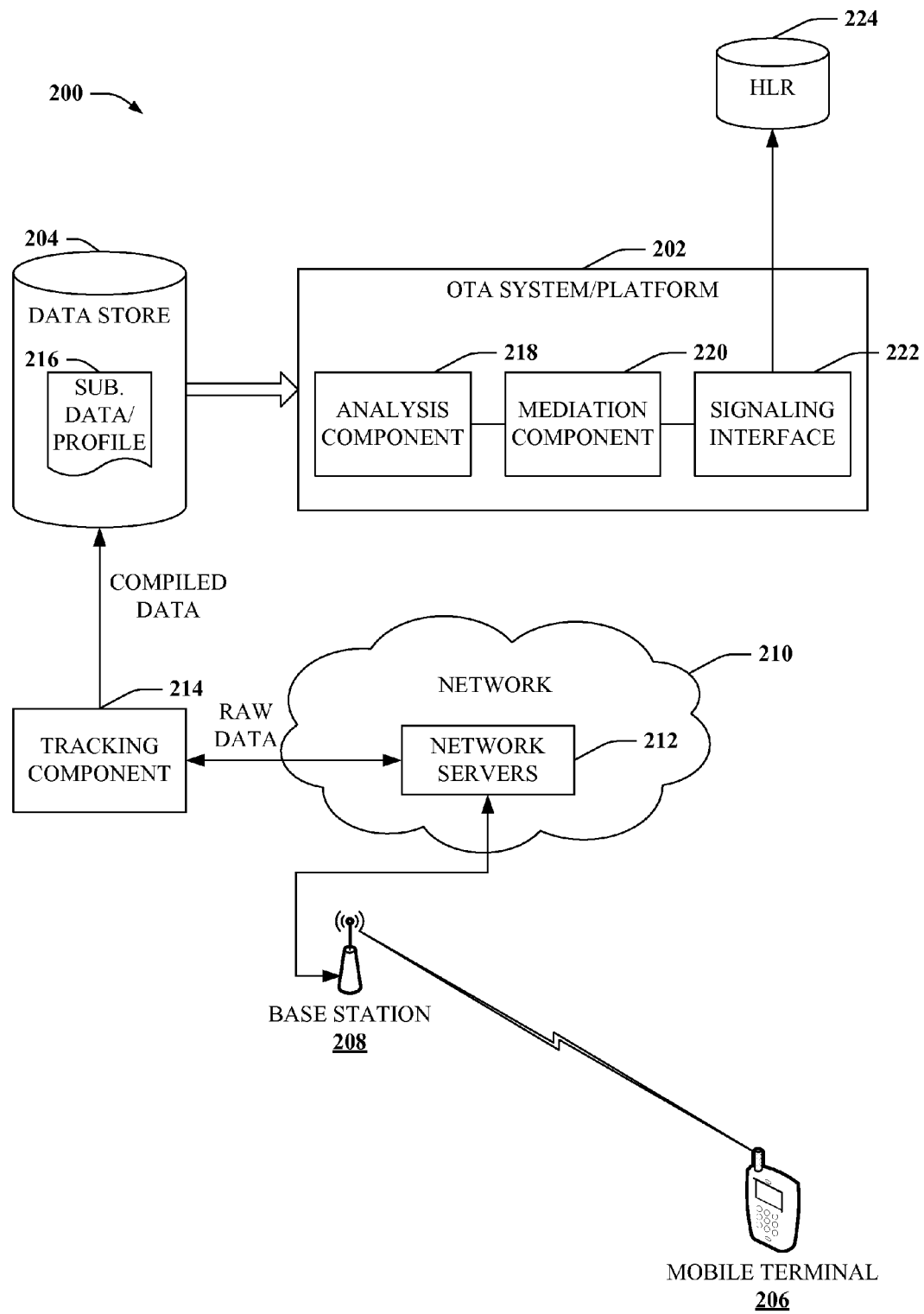
FIG. 2 depicts a block diagram of a sample system that tracks terminal usage for network selection according to other aspects.

FIG. 2 depicts a block diagram of an example system 200 for determining subscriber usage patterns for network selection. System 200 can comprise an OTA system/platform 202 that analyzes network and terminal related data to assist in network selection for mobile terminals (206). By employing such information, system 200 can increase network load efficiency, utilization of network services, and the like, by pairing a mobile terminal 206 with an optimal network based on terminal capability and usage patterns.

OTA system/platform 202 is coupled to a data store 204 that stores information pertaining to mobile network usage patterns of a mobile terminal 206, as described herein. The mobile terminal 206 accesses a mobile network 210 via one or more wireless base stations 208 (e.g., base transceiver station [BTS], radio base station (RBS), Node B, home Node B (HNB), enhanced Node B (eNB) or enhanced home Node B (HeNB). The base station(s) 208 acts as a wireless access point to network 210, enabling wireless access to mobile communication services, such as voice calls, short message service (SMS), data calls etc., and mobile data services, such as Internet browsing, text messaging, and the like. The network 210 includes various network servers 212 to implement communication services and communication functions. Servers can include billing and charging servers, OTA provisioning servers, switch control, and so on. One function of servers 212 can be to maintain usage records pertaining to mobile services consumed by mobile terminal 206. Examples of such records can comprise time spent utilizing voice services (e.g., call minutes), KB of data consumed, instances that a particular service is engaged (e.g., number of times VoIP, streaming video, streaming audio, etc., are employed), or the like. Such usage can be extracted and categorized by a tracking component 214 and stored at data store 204 in a subscriber data profile 216.

OTA system/platform 202 can comprise an analysis component 218 that employs the data stored in the subscriber data profile 216 to determine usage patterns of the mobile terminal 206. In some aspects, usage patterns can be determined over particular time periods. For instance, where OTA system/platform 202 determines that mobile terminal 206 is eligible for network selection, mediation module 220 can implement a determination period (DP). Analysis component 218 can determine the usage behavior of mobile terminal 206 from data stored in the subscriber data profile 216 over the DP. The usage behavior for the DP is forwarded to the mediation component 220 for network selection.

Mediation component 220 can employ one or more thresholds for establishing a suitable default network for the mobile terminal 206. The thresholds can be set based on load, capacity and resources of a particular network. Thus, for instance, a data usage threshold for a 2G/3G network can be based on data capacity of the network (e.g., 10 megabits per second [Mb/s]), compared with average usage (e.g., 7 Mb/s) and average load (e.g., 20 terminals at 0.35 Mb/s average). Thus, a data threshold for the 2G/3G network might be 0.35 Mb/s, or some other suitable value. Accordingly, mediation component 220 can employ the data usage analysis pertaining to mobile terminal 206 and compare the usage to thresholds for a 2G network, having a relatively low data rate, and 2G/3G network, having a relatively high data rate. Thus, utilizing the foregoing example, if the data usage does not exceed 0.35 Mb/s during the DP (or, e.g., is within a predetermined percentage of the threshold), mediation component 220 can select the 2G network for mobile terminal 206. On the other hand, if the data usage exceeds the 0.35 Mb/s threshold during the DP, the 2G/3G network can be selected for the mobile terminal 206.

In some aspects of the subject disclosure, mediation component 220 can employ a signaling interface 222 to obtain subscriber information and/or preferences for mobile terminal 206 from an HLR 224. Thus, for instance, where a subscriber profile indicates that data services or high data usage is preferred, mediation component 220 can employ the high data usage preference in the network selection. Thus, for instance, even though data usage for the mobile terminal 206 is below a threshold for 2G/3G network selection, mediation component 220 can select the 2G/3G network based on the subscriber profile preference.

In addition to the foregoing, mediation component 220 can initiate a re-evaluation period (RP) after selecting a network for the mobile terminal 206. During the RP, analysis component 218 tracks usage characteristics of the terminal 206. The RP usage characteristics can be forwarded to mediation component 220 for further determination. Based on such determination, the mediation component 220 can maintain the selected network as a default for mobile terminal 206, or select a different network. To continue the foregoing example, if the data usage exceeds the 0.35 Mb/s threshold during the RP, and a subscriber profile does not indicate a preference for 2G networks, mediation component 220 can switch the default network to a 2G/3G network. Once the default network is switched, a second RP can be initiated to further monitor terminal data usage. Upon expiration of the RP, a further determination can be made, as described above.

Figure 3:
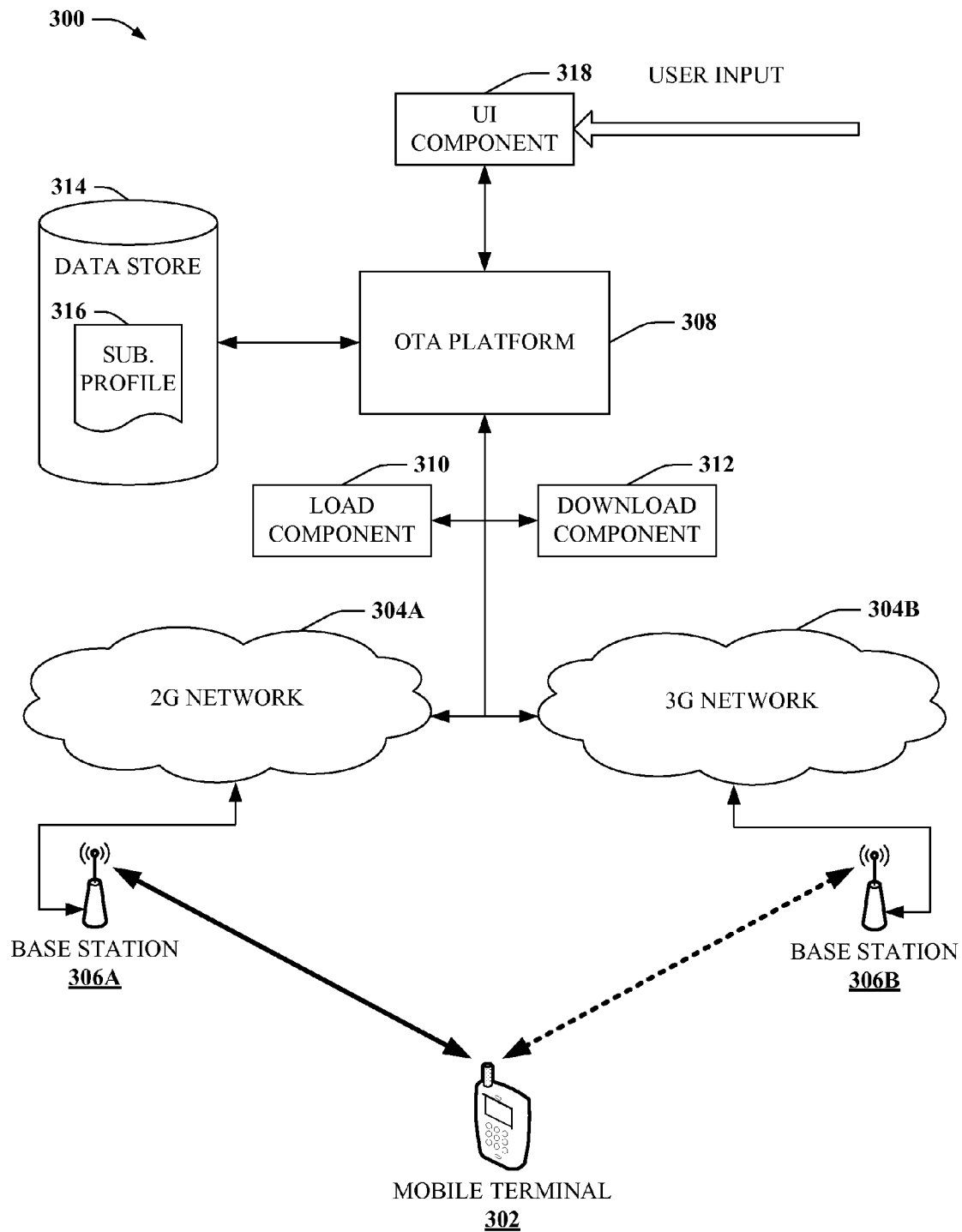
FIG. 3 illustrates a block diagram of an example system that employs terminal usage to select a suitable network for a terminal.

FIG. 3 depicts a block diagram of an example system 300 that provides network selection for a mobile terminal 302. As described herein, network selection is based on eligibility of the terminal 302 for such selection (e.g., based on access capabilities of the terminal 302, on available networks, user preferences, customer service settings, and the like) and usage history. Additionally, system 300 can incorporate customer service settings on network selection, such as a service directed network selection, locking a network selection to prevent subsequent changes in network selection, or employing a super-lock, requiring authorized input, optionally via a special interface (318) to un-lock the network selection. System 300, therefore, provides added flexibility in automatic network selection, provider control for subscribers or service provider personnel to override default network selection logic.

System 300 comprises an OTA platform 308 that provides network selection for mobile terminal 302, as described herein. The terminal 302 can be configured to access multiple mobile networks 304A, 304B, utilizing respective access points (e.g., base stations 306A, 306B). In some aspects, the mobile networks 304A, 304B can be different types of networks, such as a 2G network 304A and a 3G network 304B. It should be appreciated, however, that various other types of networks are contemplated as part of network selection, depending on access capabilities of mobile terminal 302 or a SIM card (e.g., containing active subscriptions to one or more such networks) employed by such terminal 302. Thus, for instance, the respective networks 304A, 304B can be include 2G, 2G/3G, 3G, or 4G networks, WiFi networks, or the like, or a combination thereof.

OTA platform 308 can determine access capabilities of the mobile terminal 302 to identify whether network selection is suitable for the terminal, or to limit prospective network selections. The access capabilities can be obtained by querying mobile terminal 302 via OTA communication through a mobile network 304A, 304B, by accessing a data store 314 comprising a subscriber profile record 316, by accessing an HLR (not depicted) comprising such information, or the like. OTA platform 308 can then determine the types of networks 304A, 304B observed by the mobile terminal 302. As depicted in the example provided by system 300, two networks are available for mobile terminal 302, a 2G network 304A (e.g., a GSM network) and a 3G network 304B (e.g., a UMTS network). Upon comparing the access capabilities with the available networks 304A, 304B, OTA platform 308 can limit the prospective networks available for selection.

If multiple networks observed by mobile terminal 302 are also accessible by the terminal, OTA platform 308 initiates logic to select a network as a default, as described herein. Thus, for instance, if mobile terminal 302 data usage is below a threshold, the 2G network can be selected in lieu of the 3G network, and so on. In some aspects of the subject disclosure, a loading component 310 can monitor contemporaneous load of the respective networks 304A, 304B. If the load of either network rises above a threshold level, or services, connectivity, throughput, etc., drop below a reliability threshold, OTA platform 308 can forego selection of one network in favor of another. To continue the previous example, if the current load on the 2G network indicates that call connectivity is suspect, the 3G network 304B can be selected for mobile terminal 302 instead of the 2G network. Once a selection is made, a download component 312 can be employed to send suitable information/applications to the mobile terminal in order to modify default network selection procedures. Thus, for instance, if the mobile terminal is configured to select the 3G network 304B over the 2G network 304A, an application updating this configuration can be provisioned OTA to the mobile terminal by download component 312.

In addition to the foregoing, OTA platform 308 can connect to a customer service UI interface 318 that obtains authorized user input pertaining to network selection. The authorized user can comprise, for instance, customer service personnel of an operator providing mobile services for mobile terminal 302. Based on the authorized input, OTA platform 308 can select one of the networks 304A, 304B, override a previous selection, and so forth. Additionally, user input can lock a particular network selection to prevent OTA platform 308 from changing the selection based on network conditions. A locked selection can be changed only based on further user input. In some aspects, the further user input can comprise subsequent authorized customer service input, or subscriber input (e.g., entered onto mobile terminal 302). According to further aspects, network selection can be super-locked, requiring authorized customer service input to override the lock. In such aspects, the authorized customer service input can require a high level access, over and above authorization required to manually select a network or lock such a selection. Thus, for instance, approval of a high level technician, a billings and account manager, or the like, can be required to override the super-lock. Thus, where a subscriber is not current on 3G service account payments for instance, network selection can be super-locked to the 2G network, preventing utilization of the 3G services. As described, system 300 provides additional flexibility for network selection, enabling manual network selection or selection override based on logic that might not be implemented in the determination employed by OTA platform 308.

Figure 4:
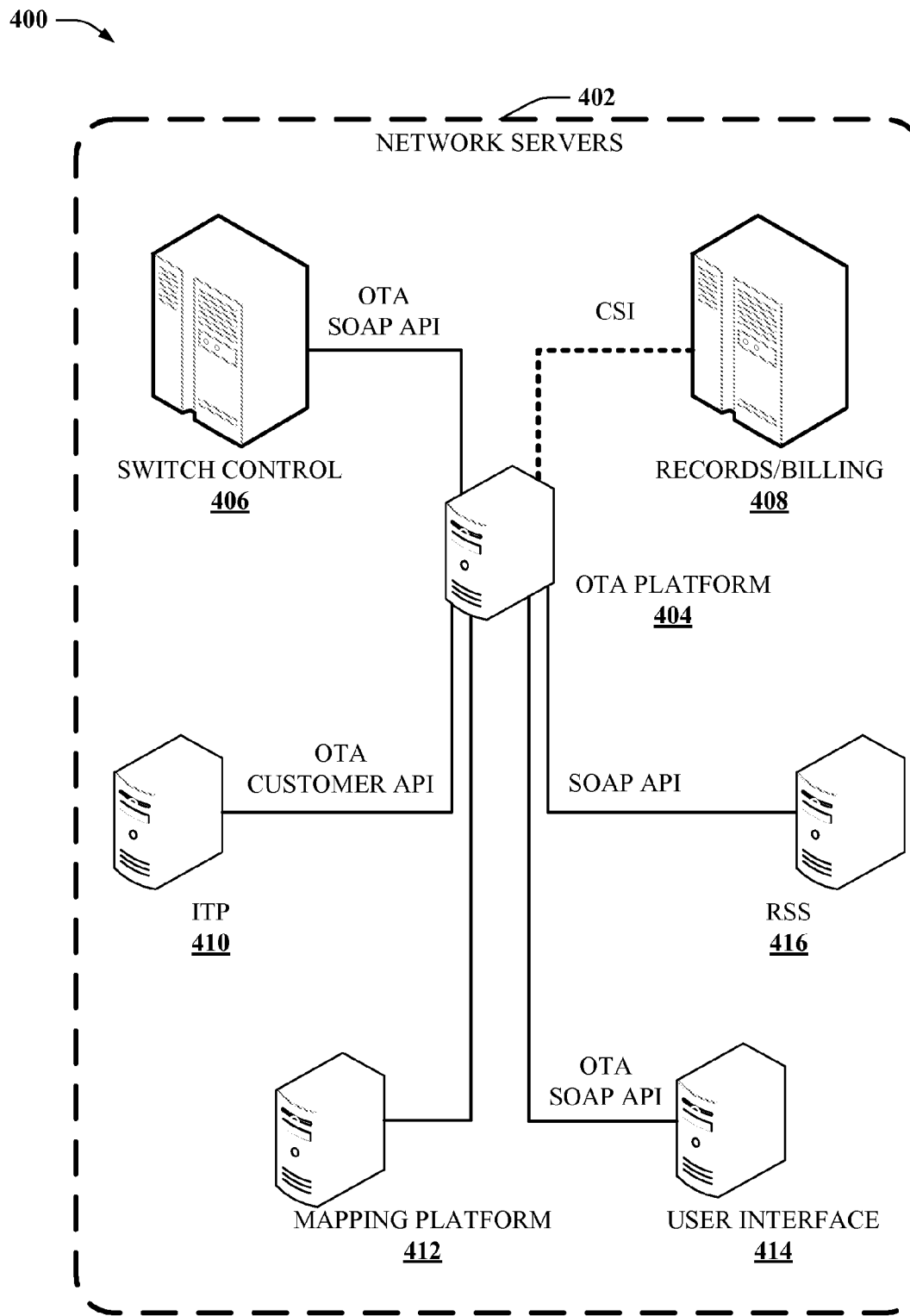
FIG. 4 depicts a block diagram of an example network arrangement for tracking data and usage patterns of mobile terminal devices in other aspects.

FIG. 4 depicts a block diagram of an exemplary system 400 for providing automated network selection according to further aspects of the subject disclosure. System 400 comprises a set of network servers and functional platforms 402 communicatively coupled to share information pertaining to the various functions and services performed by individual servers/platforms (404, 406, 408, 410, 412, 414). Specifically, system 400 can comprise an OTA platform 404 that includes business logic configured to implement network selection for a mobile terminal based on access capabilities of the terminal, data usage history, user preferences, billing and account plans, customer service input, or the like, or a combination thereof. OTA platform 404 is coupled with the various other servers/platforms (406, 408, 410, 412, 414) via one or more communication interfaces, discussed in more detail below.

The OTA platform 404 can be coupled with a switch control 406 via an OTA SOAP application programming interface (API) (e.g., the simple object access protocol, or later versions thereof). Switch control 406 can maintain network selection capabilities of mobile terminals. Such capabilities can be determined by comparing an international mobile equipment identifier (IMEI) entered at a point of sale (POS) for a subscriber with a billing system IMEI table, maintained by a records and billing platform 408. The billing system IMEI table can maintain a list of device capability values (DCAP value) as a function of ranges of IMEI values, and employ a communication interface to provide the DCAP value to other components (e.g., a common services interface CSI). By comparing the IMEI value to the IMEI table, switch control 406 can extract and store network selection capabilities of mobile terminals. OTA platform 406 can employ an IMEI of a mobile terminal to query the DCAP value of the mobile terminal from the switch control. Furthermore, if the DCAP value indicates the mobile terminal is not eligible for network selection, OTA platform 404 can verify this result by referencing a terminal support table maintained by an IMEI trigger platform (ITP) 410.

ITP 410 can separately maintain and reference a terminal support network selection table. Such a table can list network-select capabilities as well as current network-select settings (e.g., a default selection, locked or super-locked selection, DP, RP) as a function of mobile identifier (e.g., IMEI). If a network-select value is available, ITP 410 can return such value to the OTA platform 404. Otherwise, ITP 410 responds indicating such a value is not currently available and can wait for a response from the mobile terminal for a default network-select update period (e.g., an hour, 12 hours, a day, 2 days, etc.). If the network-select value is provided by the terminal in the update period, ITP 410 will provide the value to OTA platform 404. Otherwise, ITP 410 responds indicating that the mobile terminal is not network-select capable.

Additionally, system 400 can comprise a roaming selection server (RSS) 416 that can determine whether a subscriber's mobile terminal is roaming on a foreign network. According to some aspects of the subject disclosure, such determination can also include whether the mobile terminal is configured for network selection, and any network selection values currently established for the subscriber (e.g., a network selection, a network selection lock or super-lock, a data usage determination period, a data usage re-evaluation period, or the like). When the subscriber registers on the foreign network, RSS 416 can determine whether the current network selection (if any) should be maintained or changed, or returned to terminal defaults. The determination can be made on whether the foreign network is network-select capable, whether suitable contracts with the foreign network exist, or the like. If the foreign network is not network-select capable, RSS 416 can request the OTA platform 404 restore terminal defaults, or select a most preferred network consistent with subscriber profile information (e.g., based on subscription records maintained at records and billing platform 408).

If RSS 416 requests a change to a subscriber's network selection, OTA platform 404 can implement the change. The change can be maintained for a default period of time (e.g., a week, month, etc.), or can be maintained until the subscriber registers onto network-select capable network. Once the default period of time expires, or the subscriber registers onto a network-select capable network, RSS 416 can update the OTA platform 404 to implement further network-select functions based on such result.

According to still other aspects, system 400 can comprise a mapping platform 412 that tracks cellular network coverage. OTA platform 404 can update the mapping platform 412 with a network-select value that can be referenced by the mapping platform 412 relative to current network coverage of a mobile terminal associated with the value. OTA platform 404 can further be coupled with a user interface 414 via an OTA SOAP API. As described herein, the user interface 414 can provide authorized input to the OTA platform 404 for manual network selection, or locking or super-locking a selection. It should be appreciated that the server/platform configuration depicted by system 400 is but one exemplary arrangement suitable to determine suitability of network selection or implement network selection, as described herein. Many other server/platform arrangements are contemplated as part of the subject disclosure, based on differences in network tracking, billing, roaming and like functions, of various networks or network operators. Thus, system 400 should not be limited to the depicted illustrative embodiment of the subject disclosure, but include other suitable arrangements for carrying out the above described functions or related functions related.

The aforementioned systems have been described with respect to interaction between several components. It should be appreciated that such systems and components can include those components or sub-components specified therein, some of the specified components or sub-components, and/or additional components. For example, a system could include network provisioning system 102, data store 204, load component 310 and download component 312, or a different combination of these and other components. Sub-components could also be implemented as components communicatively coupled to other components rather than included within parent components. Additionally, it should be noted that one or more components could be combined into a single component providing aggregate functionality. For instance, records and billing 408 can include switch control 406, or vice versa, to facilitate maintaining device capabilities and reporting such capabilities to an OTA platform 404 by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 5-18. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or media.

Figure 5:
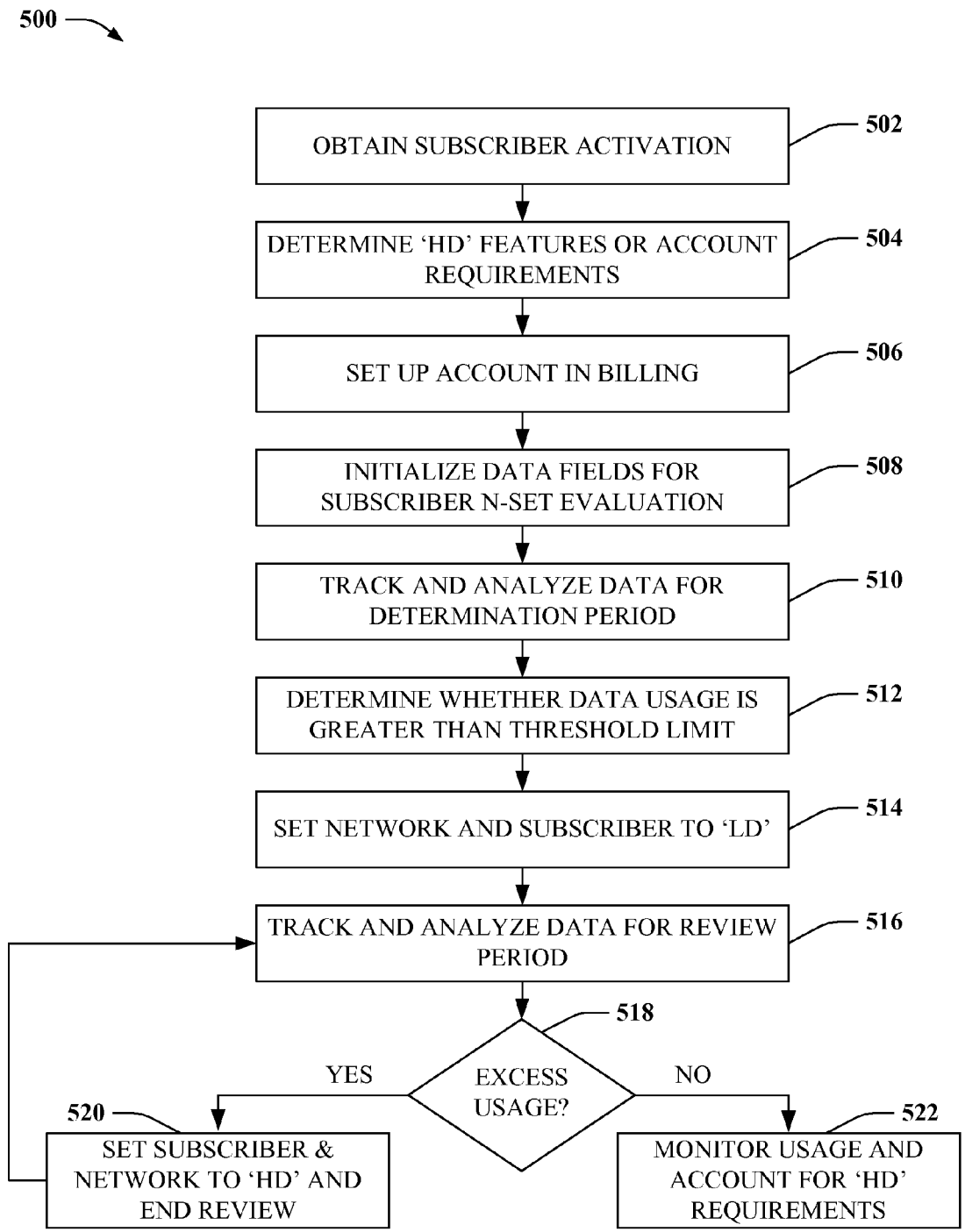
FIG. 5 illustrates a flowchart of an example methodology for network selection management according to other aspects disclosed herein.

FIG. 5 depicts a block diagram of an example methodology 500 for network selection in a mobile operating environment. At 502, method 500 can obtain subscriber activation information 502. Activation information can comprise a mobile terminal identifier (e.g., IMEI, international mobile subscriber identifier [IMSI], or the like). Additionally, at 504, method 500 can obtain or identify features or subscriber account requirements requiring or preferring relatively high data ('HD') network capabilities. 'HD' features can include a data rate service plan, unlimited data usage or other preferred billing plan for data usage, high QoS services such as streaming media applications, and so forth. Additionally, subscriber account preferences can include a user profile indicating an 'HD' network as a preferred network, customer service profile for the subscriber indicating 'HD' network as preferred, or the like.

At 506, method 500 can set up a network-select (N-Set) account for the subscriber in a records and billing function. At 508, method 500 can initialize data fields for subscriber N-Set evaluation. At 510, method 500 can track and analyze data usage for a determination period (DP). At 512, method 500 can determine whether the data usage is greater than a threshold limit (e.g., based on network load, number of subscribers, average subscriber data usage, etc.). If not, method 500 can store an N-Set value for the subscriber to 'LD', representing a relatively low data network as a default for the subscriber (e.g., a 2G network). At 516, method 500 can track and analyze the data on the 'LD' network for a review period. At 518, a determination is made as to whether data usage exceeds a review threshold. If so, method 500 proceeds to 520; otherwise method 500 can proceed to 522.

At 520, method 500 can set the subscriber N-Set value to 'HD' and terminate the 'LD' review. Method 500 can then return to reference number 516 and track and analyze data usage for an 'HD' review period. At 522, method 500 can monitor usage and account changes for 'HD' requirements. Such requirements can include increase of data usage beyond the 'LD' threshold limit, addition of an 'HD' feature, or subscriber profile or customer service profile indicating a preference for 'HD' network selection, or the like. Accordingly, method 500 can select a network according to usage needs of the subscriber, and balance network traffic among subscribers most likely to require particular services provided by particular networks and subscribers utilizing fewer or none of those services.

Figure 6:
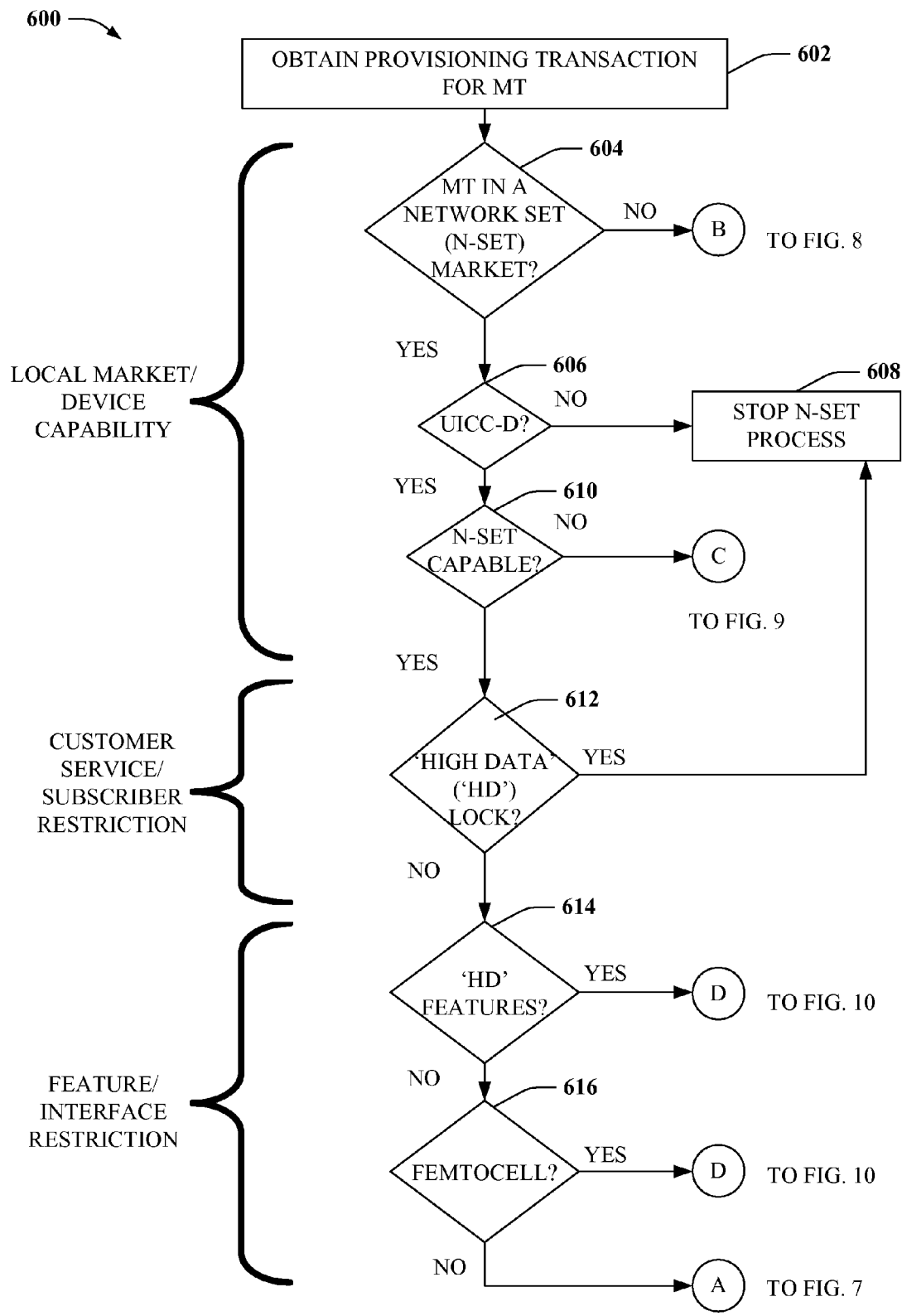
FIGS. 6 and 7 depict a flowchart of a sample methodology for determining whether a terminal is suited for network selection management as disclosed herein.
Figure 7:
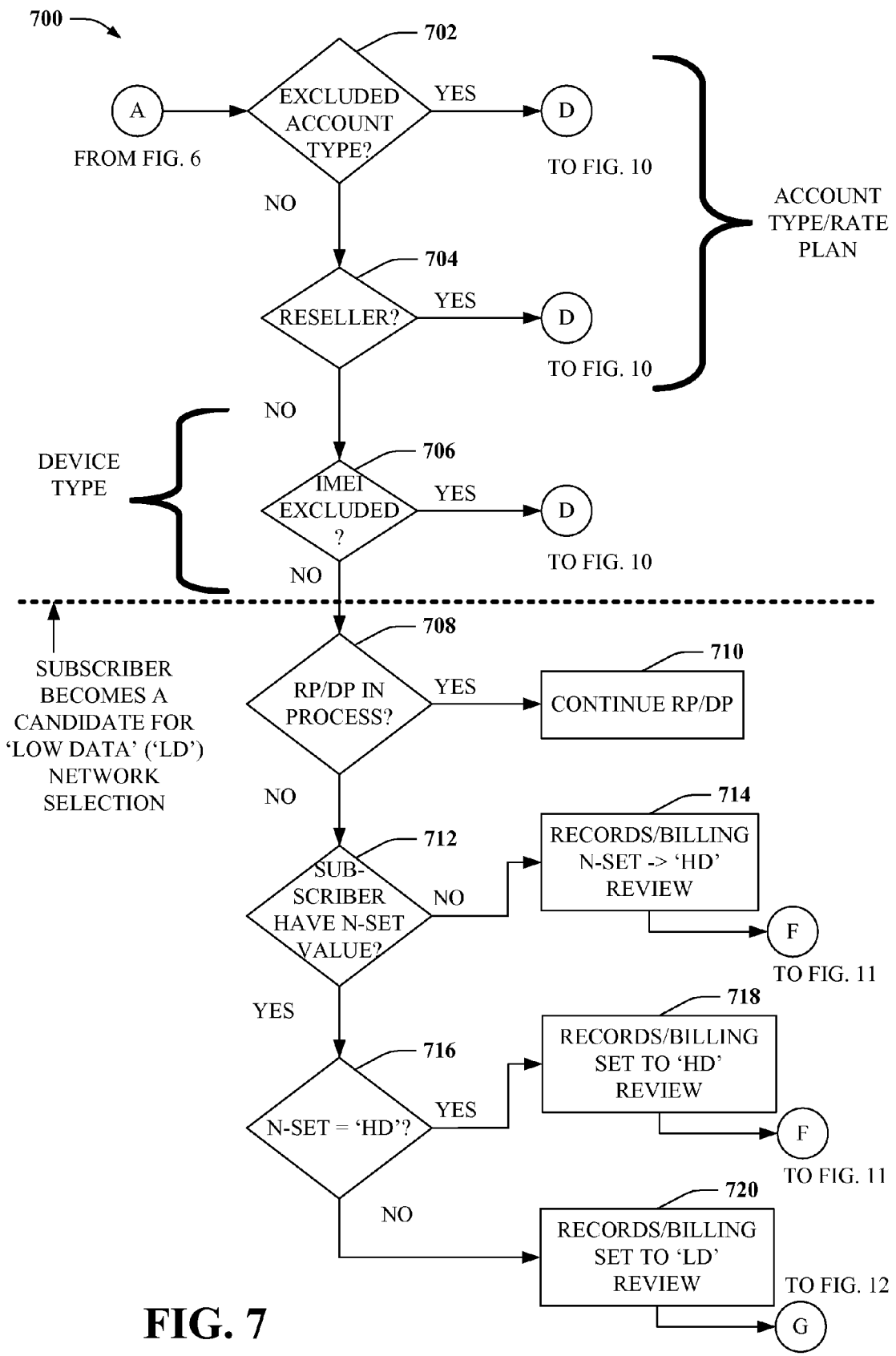

FIGS. 6 and 7 depict example methodologies 600, 700 for determining whether a mobile terminal is suited for network selection, or whether network selection procedures are in process for a particular subscriber. At 602, method 600 can identify a provisioning transaction for a mobile terminal. The provisioning transaction can comprise changes in a user account (e.g., addition/deletion/modification of a mobile service), a change in network location (e.g., roaming to a foreign network), an update in subscriber profile information, an update in customer service provide information for the subscriber, or the like. At 604, method 600 can determine whether the mobile terminal is in a market or region that supports N-Set functionality. If not, method 600 can proceed to FIG. 8 at 802 to update N-Set values and network/terminal provisioning for the market. Otherwise, method 600 can proceed to 606.

At 606, method 600 can determine whether the mobile terminal includes an N-Set capable SIM card, or UICC-D. If not, method 600 can terminate the N-Set process at 608; otherwise method 600 can proceed to 610. At 610, method 600 can determine whether the mobile terminal is N-Set capable. Such determination can be based on whether the mobile terminal is capable of accessing multiple N-Set networks in a particular market. If the mobile terminal is not N-Set capable, method 600 can proceed to FIG. 9 at 902 to verify device capability, for instance based on ITP provisioning. Otherwise, method 600 can proceed to 612.

At 612, method 600 can determine whether the mobile terminal is locked at a particular N-Set value (e.g., locked on 'HD' network selection, or 'LD' network selection, or a suitable variation thereof). If the mobile terminal is N-Set locked, method 600 can proceed to 608 can terminate the N-Set process. Otherwise, method 600 can proceed to 614. At 614, method 600 can determine whether a subscriber account associated with the mobile terminal employs 'HD' features (e.g., a data-service rate plan, unlimited data usage, high QoS features, or the like). If 'HD' features are employed, method 600 can proceed to FIG. 10 at 1002, otherwise method 600 can proceed to 616. At 616, method 600 can determine whether the mobile terminal is configured for access to a femtocell access point (e.g., HNB, HeNB). If the mobile terminal is not configured for femtocell access, method 600 can proceed to FIG. 10 at 1002; otherwise method 600 can proceed to FIG. 7 at 702.

Referring now to FIG. 7 and methodology 700, at 702 method 700 can determine whether the mobile terminal has an account type or rate plan that excludes N-Set provisioning. If so, method 700 proceeds to FIG. 10 at 1002; otherwise method 700 can proceed to 704. At 704, method 700 can determine whether the mobile terminal is associated with a reseller that prohibits N-Set provisioning. If so, method 700 can proceed to FIG. 10 at 1002; otherwise method 700 can proceed to 706. At 706, method 700 can determine whether the mobile device is associated with a mobile identifier (e.g., IMEI) that prohibits N-Set provisioning or prohibits change to a current N-Set value. For instance, the identifier can be locked or super-locked from changes and loaded into a database for locked/super-locked terminals. As another example, the IMEI can be associated with a terminal or SIM card that does not have multiple network access capabilities. If the identifier is excluded from N-Set provisioning, method 700 proceeds to FIG. 10 at 1002; otherwise method 700 can proceed to 708.

Once method 700 reaches 708, the mobile terminal is deemed to be capable of N-Set provisioning and not excluded from such provisioning. Subsequent determinations (708, 712, 716) therefore are directed to determining current N-Set values of the terminal or determining whether an N-Set evaluation process is in progress.

At 708, method 700 can determine whether a service usage DP or RP is in progress for the mobile terminal. If so, the DP or RP is continued at 710, and method 700 terminates. Otherwise, method 700 can proceed to 712. At 712, method 700 can determine whether the subscriber has a current N-Set value (e.g., set to 'LD' or 'HD', locked, super-locked, 'LD' or 'HD' evaluation or re-evaluation). If not, method 700 can proceed to 714 where the N-Set value is updated to 'HD' review in a network records and billing function; otherwise method 700 can proceed to 716. From 718, method 700 can proceed to FIG. 11 at 1102.

At 716, method 700 can determine whether the N-Set value for the mobile terminal is set to 'HD'. If so, method 700 proceeds to 718 where the N-Set value in the network records and billing function is set to 'HD' review, and method 700 can proceed to FIG. 11 at 1102. If the N-Set value for the mobile terminal is not set to 'HD', method 700 proceeds to 720, where the N-Set value in the network records and billing function is updated to 'LD' review. From 720, method 700 can proceed to FIG. 12 at 1202.

Figure 8:
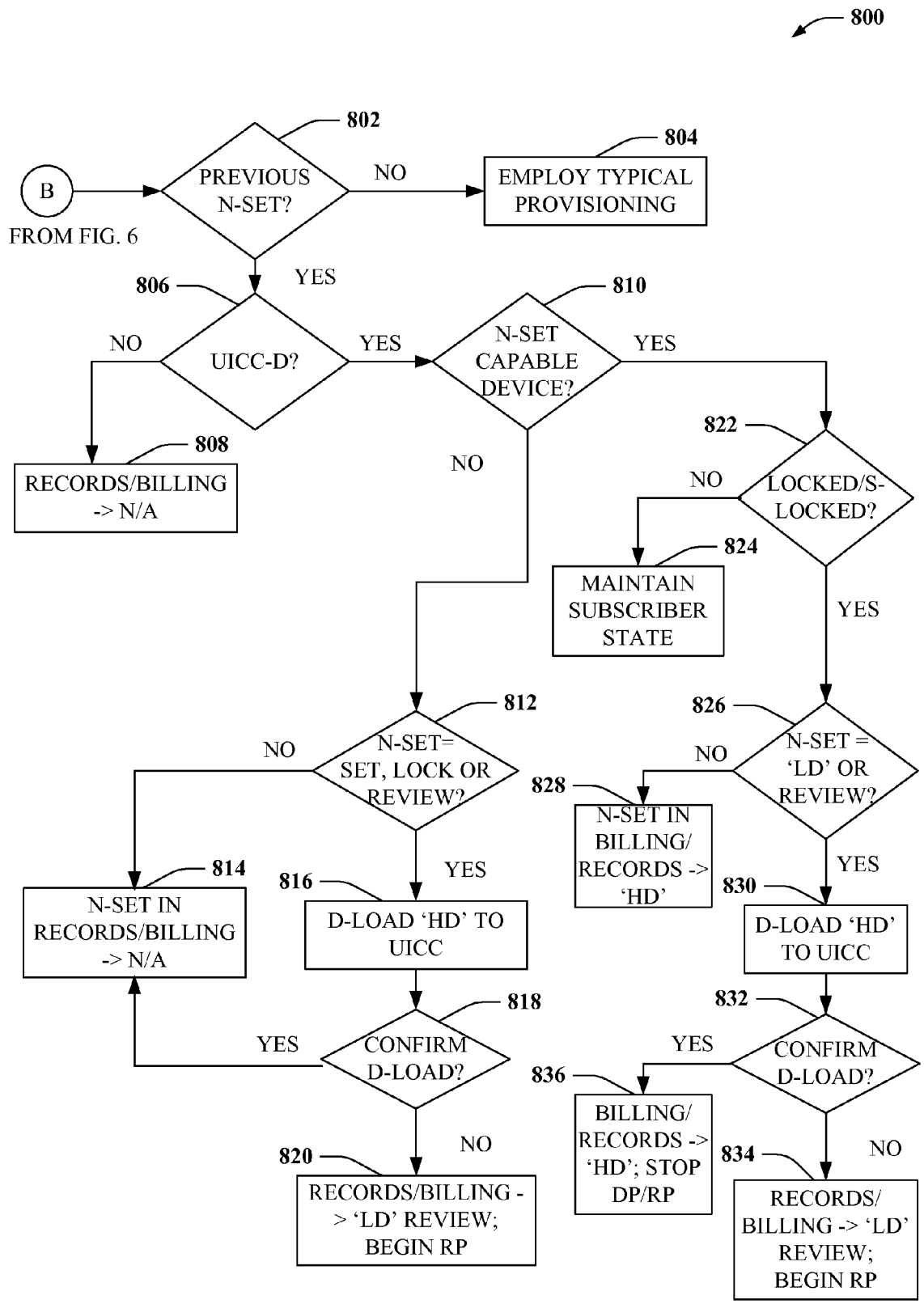
FIG. 8 depicts a flowchart of an example methodology for network selection in accordance with aspects disclosed herein.

FIG. 8 depicts a flowchart of an example methodology 800 for determining N-Set provisioning in a market that does not support N-Set functionality. Method 800 continues from FIG. 6 at 604. At 802, method 800 can determine whether a previous N-Set value for a mobile device exists. If not, method 800 can proceed to 804; otherwise method 800 continues at 806. At 804, method 800 can employ typical OTA provisioning for the mobile terminal upon determining that no previous N-Set value exists for the terminal, and terminate the process.

At 806, method 800 can determine whether the mobile terminal has a UICC-D (e.g., SIM card) that supports N-Set provisioning. If so, method 800 can proceed to 810. Otherwise, method 800 continues at 808, where a network records and billing functions is updated to indicate that the N-Set functionality is not supported for the UICC-D.

At 810, method 800 can determine whether the mobile terminal is an N-Set capable terminal. If not, method 800 proceeds to 812; otherwise method 800 can continue at 822. At 812, method 800 can determine whether an N-Set value for the mobile terminal is set to a particular network selection, such as an 'HD' or 'LD' network, whether a network setting is locked, or in a usage review process. If not, method 800 can proceed to 814 and update the network records and billing function to indicate that N-Set functionality is not supported for the mobile terminal. On the other hand, if the determination at reference number 812 indicates that the mobile terminal is associated with an N-Set network selection, selection lock or selection review, method 800 proceeds to 814 where a default network selection is downloaded to the UICC-D of the mobile terminal. In some aspects, the default network selection can be a default provided by mobile terminal manufacturer specifications. In other aspects, the default can be an 'HD' network, such as 2G/3G network, 3G network, etc. At 818, method 800 can determine whether the download is confirmed at the mobile terminal UICC-D. If so, method 800 proceeds to 814 where the network records and billing function is updated to indicate that N-Set functionality is not supported by the mobile terminal. Otherwise, method 800 proceeds to 820, where method 800 can update the N-Set value at the network records and billing functionality to 'LD' review, and initiate an RP for the 'LD' setting.

At 822, method 800 can determine whether an N-Set value for the N-Set capable mobile terminal is set to locked or super-locked. If so, method 800 can proceed to 824 where the N-Set value is maintained, and the process ends. Otherwise, method 800 can proceed to 826, where a determination is made as to whether the N-Set value is 'LD' or 'LD' review. If not, method 800 proceeds to 828 where the N-Set value in the network records and billing function is updated to 'HD' setting, and the process terminates. Otherwise, method 800 proceeds to 830 where an N-Set value of 'HD' is downloaded to the UICC-D of the mobile terminal. At 832, method 800 can determine whether the download was confirmed by the mobile terminal. If not, method 800 proceeds to 834 where an N-Set value of 'LD' review is updated to the network records and billing function and re-evaluation is conducted for 'LD' setting. Otherwise, method 800 can proceed to 836, where an N-Set value of 'HD' is updated to the network records and billing function, and a DP or RP process is terminated.

Figure 9:
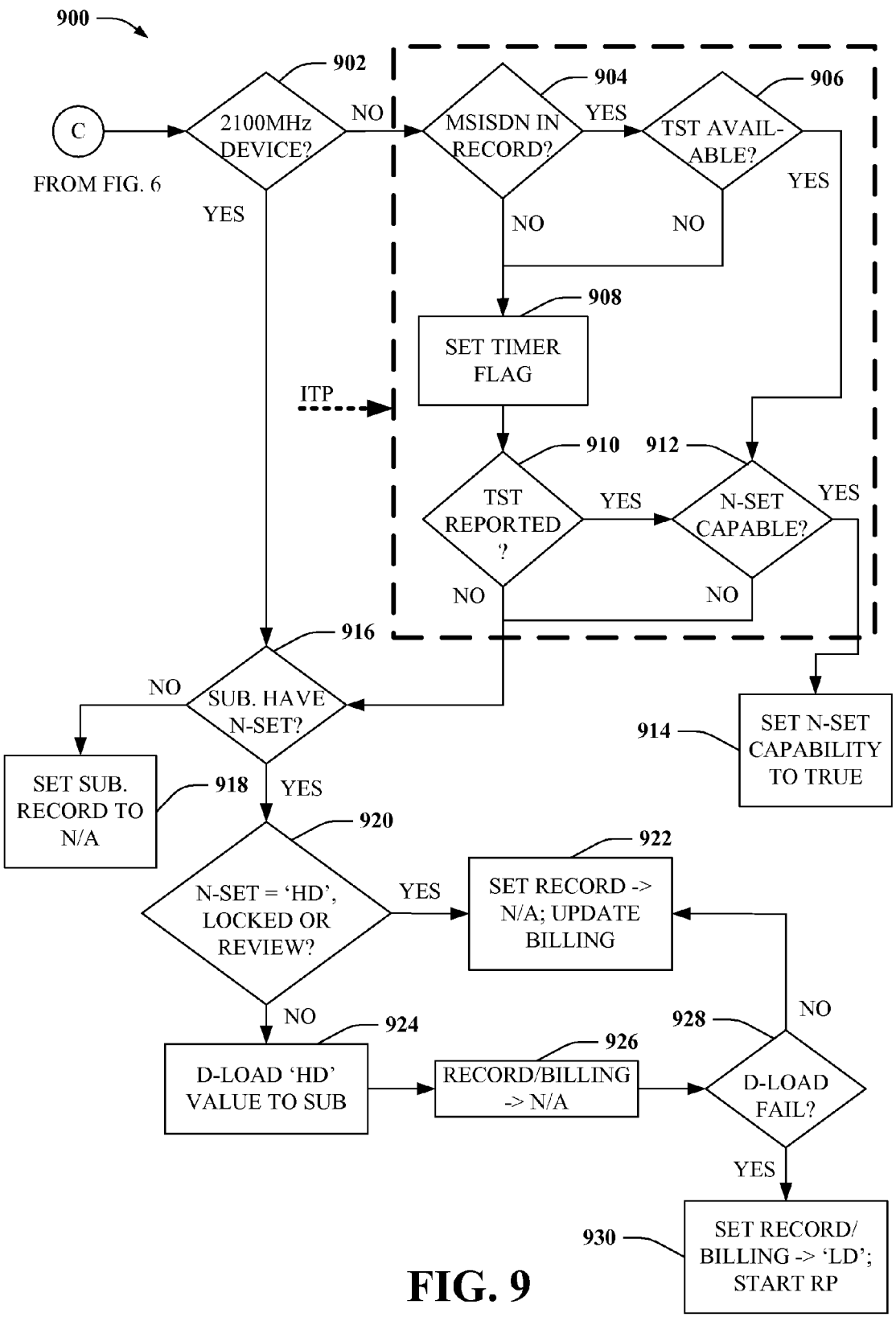
FIG. 9 illustrates a flowchart of a sample methodology for selecting a default network for a device based on device usage and capabilities.

FIG. 9 depicts a flowchart of an example methodology 900 for verifying N-Set value of a mobile terminal. At 902, method 900 can determine whether a mobile terminal is a 2100 Mhz device. The determination can be made by querying the mobile terminal, an access point serving the mobile terminal, or a subscriber profile associated with the mobile terminal. If the mobile terminal is not a 2100 Mhz device, method 900 can proceed to 904. If the mobile terminal is a 2100 Mhz device, method 900 can instead proceed to 916.

In accordance with methodology 900, reference numbers 904 through 912 can be implemented at a network ITP or a suitable device providing like functionality (e.g., see FIG. 4, supra). At 904, method 900 can determine whether an MSISDN (mobile station international integrated services digital network [ISDN] number) is on record for the mobile terminal. If so, method 900 proceeds to 906 where a determination is made as to whether an N-Set terminal support table (TST) entry is available for the mobile terminal, specifying N-Set capabilities of the terminal. If so, method 906 can proceed to 912; otherwise, method 900 proceeds to 908. At 908, method 900 can initialize a timer for N-Set TST response. At 910, a determination is made as to whether the N-Set TST entry is obtained within the timer period. If so, method 900 can proceed to 912; otherwise, method 900 proceeds to 916. At 912, method 900 can determine whether the mobile terminal is N-Set capable. If so, method 900 proceeds to 914 where an N-Set capability for the mobile terminal is set to True.

At 916, method 900 can determine whether a subscriber associated with the mobile terminal has an N-Set value. If so, method 900 proceeds to 920, otherwise method 900 can proceed to 918. At 918, method 900 can set an N-Set value for the subscriber to unavailable in a network records and billing function. At 920, method 900 can determine whether the subscriber's N-Set value is set to 'HD', 'HD' lock or 'HD' review. If so, method 900 can proceed to 922 where an N-Set value for the subscriber is set to unavailable in the network and billings function. Otherwise, method 900 proceeds to 924 where an N-Set value of 'HD' is downloaded to the subscriber's terminal. At 926, the network records and billing function can be updated to indicate the subscriber is not N-Set capable.

At 928, method 900 can determine whether the download was successful. If not, method 900 proceeds to 922. Otherwise, method 900 can proceed to 930, where the network records and billing function is updated to an N-Set value of 'LD', and 'LD' re-evaluation is initiated.

Figure 10:
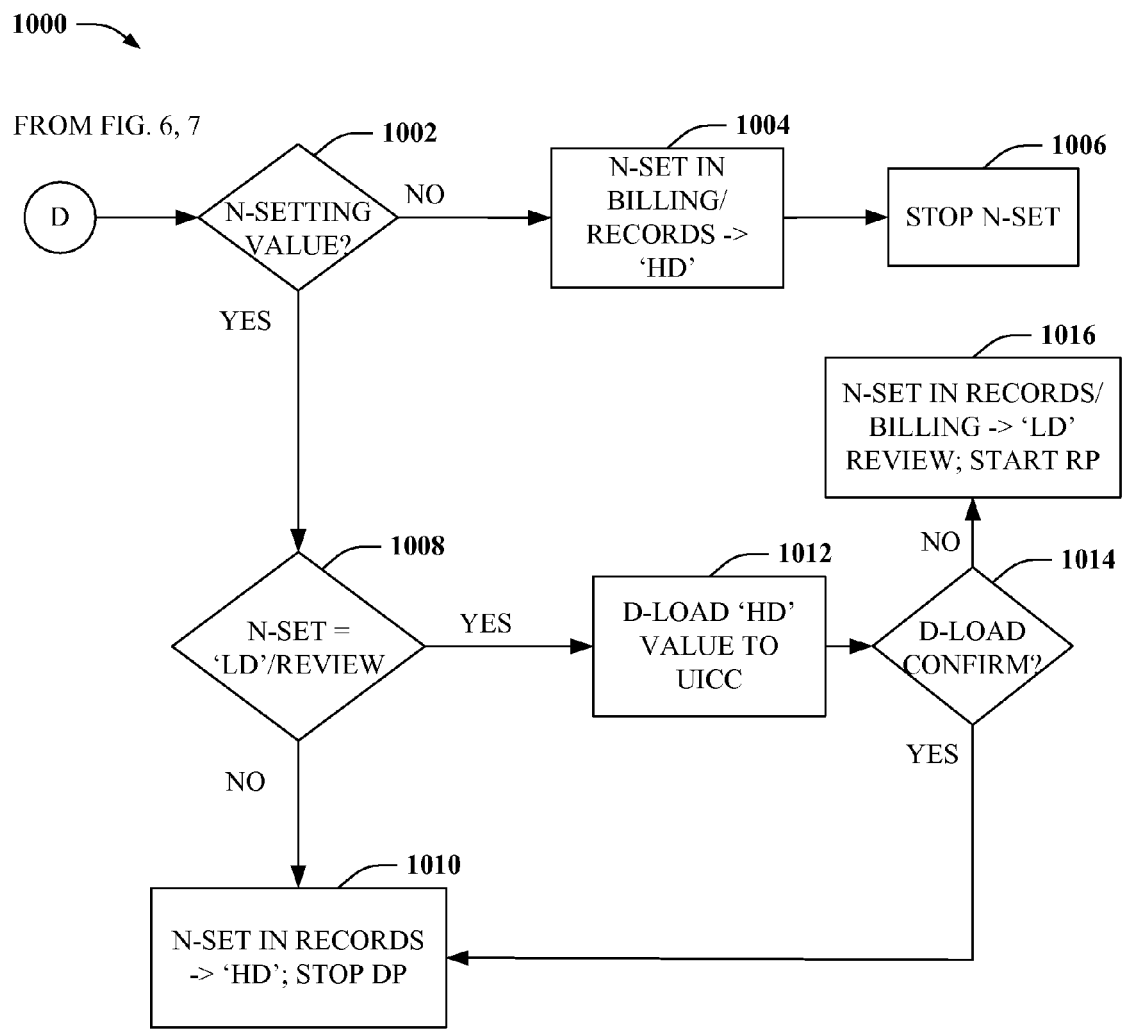
FIG. 10 depicts a flowchart of an example methodology for selecting a relatively high data network for a mobile terminal according to some aspects.

FIG. 10 depicts a flowchart of an example methodology 1000 for N-Set evaluation for a mobile terminal requiring or preferring 'HD' networks. At 1002, method 1000 can determine whether an N-Set value for the mobile terminal exists. If not, method 1002 can proceed to 1004; otherwise method 1000 proceeds to 1008. At 1004, method 1000 can update the N-Set value in a network records and billing function to 'HD'. At 1006, method 900 terminates the N-Set evaluation.

At 1008, method 1000 can determine whether the N-Set value of the mobile terminal is set to 'LD' or 'LD' review. If so, method 1000 proceeds to 1012; otherwise, method 1000 can proceed to 1010. At 1010, method 1000 can update an N-Set value in the network records and billing function to 'HD' and terminate any existing DP for the mobile terminal.

At 1012, method 1000 can download an N-Set value of 'HD' to the UICC-D of the mobile terminal. At 1014, method 1000 can obtain confirmation of the download. If the download is confirmed, method 1000 proceeds to 1010. If the download is not confirmed, method 1000 can proceed to 1016, where an N-Set value in the network records and billing function is set to 'LD' review for the mobile terminal. Upon setting the N-Set value to 'LD' review, N-Set re-evaluation is initiated.

Figure 11:
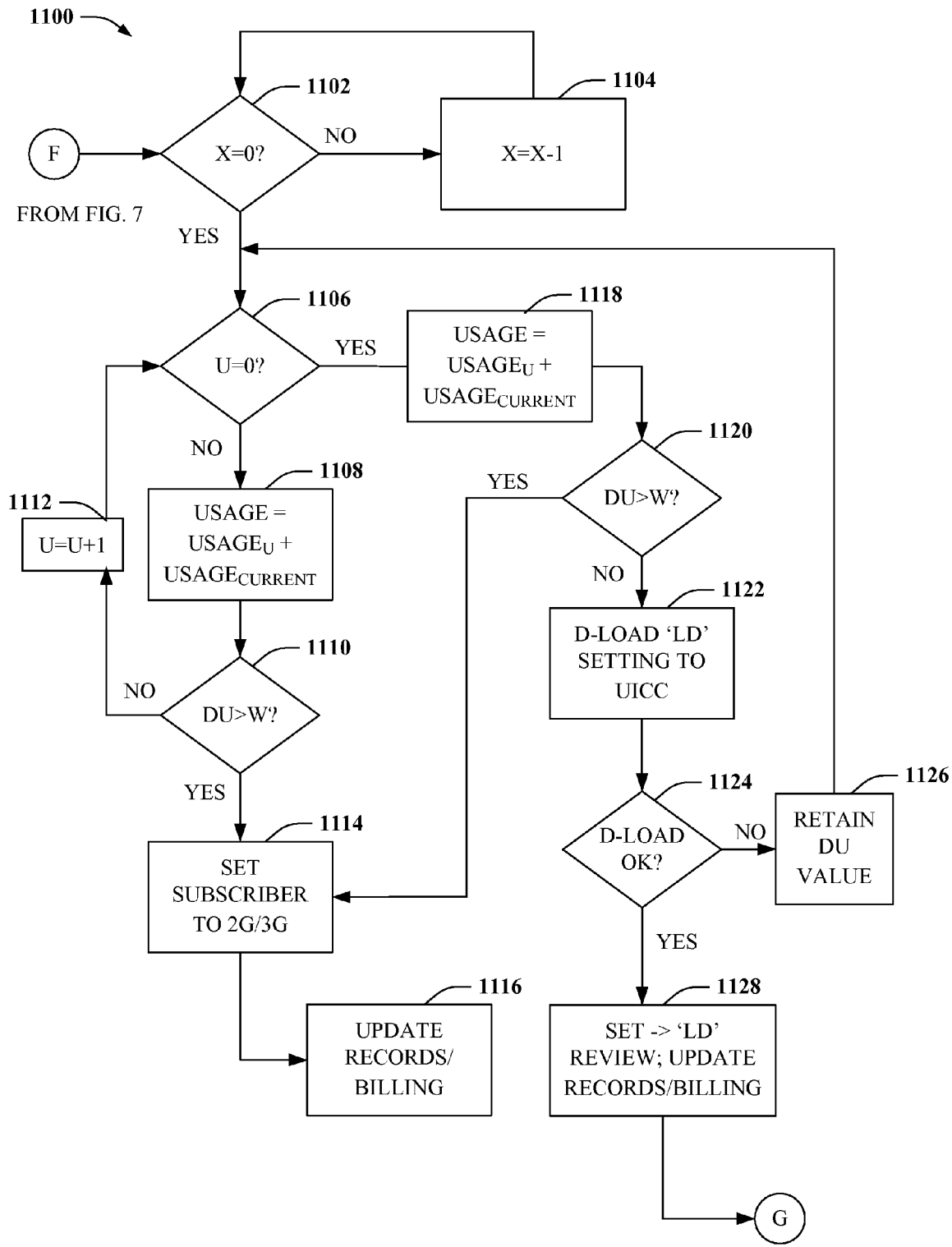
FIGS. 11 and 12 illustrate a flowchart of a sample methodology for re-evaluation network selection according to further aspects.

FIG. 11 depicts a flowchart of a sample methodology 1100 for determining mobile terminal service usage in conjunction with network selection disclosed herein. At 1102, method 1100 can determine whether a measurement wait parameter X has expired. If not, method 1100 proceeds to 1104, where X is decremented by one at the end of a predetermined time frame (e.g., at the end of an hour, a day, or other suitable period of time). If the measurement wait parameter has expired to zero, method 1100 can proceed to 1106.

At 1106, method 1100 can determine whether a service measurement period U has expired. If not, method 1100 can proceed to 1108; otherwise method 1100 proceeds to 1118. At 1108, method 1100 can set a service usage parameter DU (e.g., representing use or particular network services, or network data consumption associated with mobile data services) to the sum of service usage in U time period plus service usage in a current time period (e.g., current day, current hour, etc.). At 1110, method 1100 can determine whether DU is greater than a threshold usage parameter W. If not, method 1100 proceeds to 1112, where at the end of a measurement time period (e.g., a day), measurement period U is incremented. If DU is determined to be greater than the threshold W, method 1114 proceeds to 1114 where the subscriber N-Set value is set to 'HD'. At 1116, method 1100 can update the network records and billing function to reflect the 'HD' N-Set value.

At 1118, method 1100 can set the service usage parameter DU to the sum of the service usage in U time period plus service usage in a current time period. At 1120, method 1100 can determine whether DU is greater than the threshold usage parameter W. If so, method 1100 can proceed to 1114, as discussed above. Otherwise, method 1100 proceeds to 1122 where an N-Set value of 'LD' is downloaded to the UICC-D of the mobile terminal. At 1124, method 1100 can determine whether download confirmation is received form the mobile terminal. If not, method 1100 can proceed to 1126 where the current DU value is retained, and method 1100 proceeds back to 1106. Otherwise, method 1100 can proceed to 1128, where the network records and billing function is updated to an N-Set value of 'LD' review for the mobile terminal. From 1128, method 1100 can proceed to methodology 1200, at 1202 where 'LD' re-evaluation is conducted, discussed infra at FIG. 12.

Figure 12:
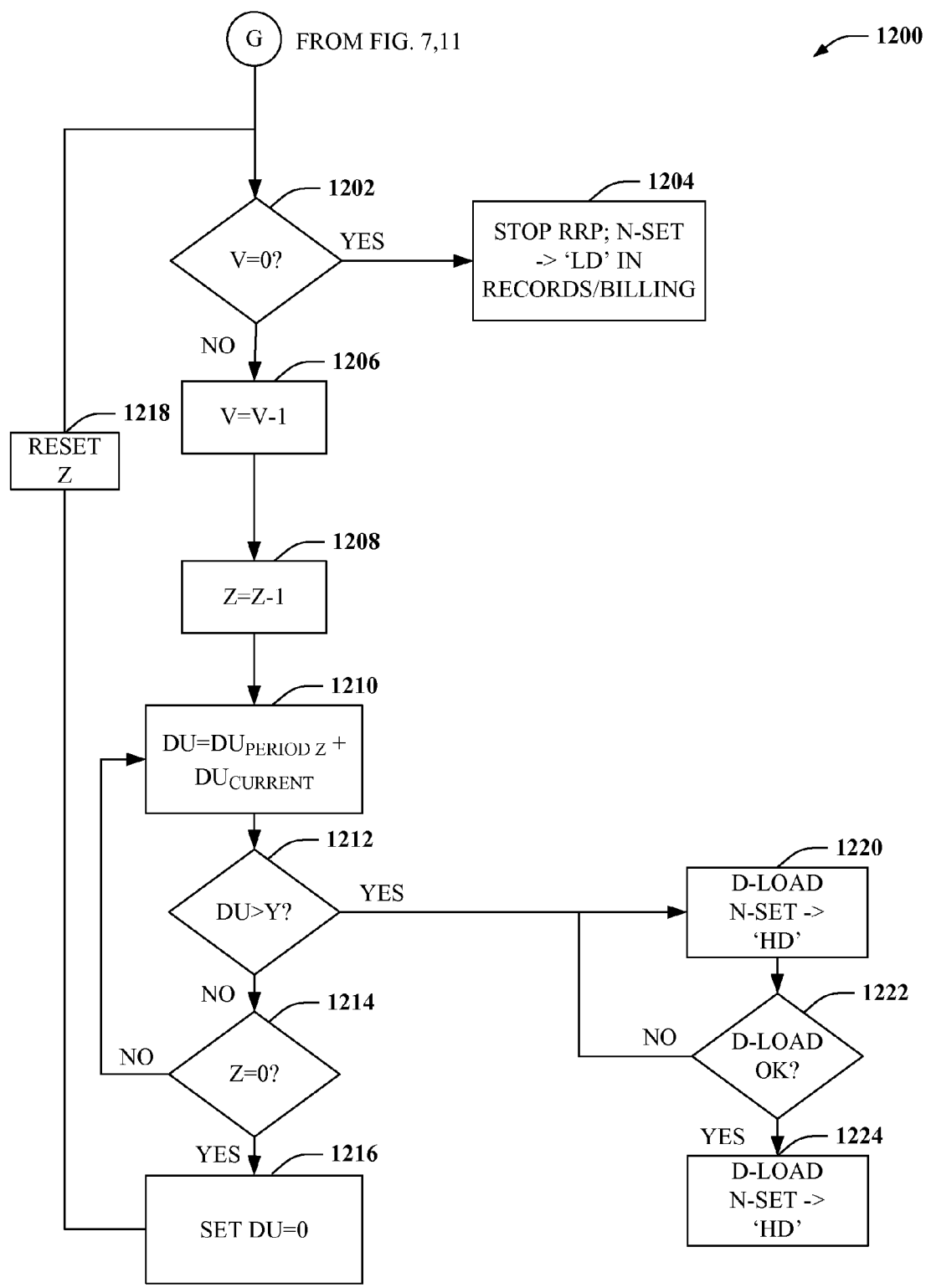

FIG. 12 depicts a flowchart of an example methodology 1200 for re-evaluating an N-Set value of 'LD' for a mobile terminal. At 1202, method 1200 can determine whether a re-evaluation period V (comprising a plurality Z of sub-periods, such as days) has expired to zero. If so, method 1200 proceeds to 1204, where re-evaluation is terminated and an N-Set value of 'LD' is updated to the network records and billing function. If the re-evaluation period V has not expired, method 1200 proceeds to 1206, where V is decremented. At 1208, method 1200 can decrement a number of re-evaluation sub-periods Z. At 1210, method 1200 can set the service usage parameter DU to service usage within the current sub-periods Z plus service usage of the current sub-period Z. At 1212, method 1200 can determine whether the service usage parameter DU is greater than a threshold usage Y. The threshold usage Y can be identical to the threshold usage W utilized for the service usage determination period described for method 1100, supra, or can be a different value utilized for re-evaluation. If the service usage parameter DU is greater than threshold Y, method 1200 can proceed to 1220; otherwise, method 1200 proceeds to 1214.

At 1214, method 1200 can determine whether the number of sub-periods Z has expired to zero. If not, method 1200 returns to 1210. Otherwise, method 1200 proceeds to 1216, where the service usage parameter DU is re-initialized at zero. At 1218, method 1200 can re-initialize the number of sub-periods Z and return to 1202.

At 1220, method 1200 can download an N-Set value of 'HD' to the mobile terminal. At 1222, method 1200 can determine whether the download is complete. If not, method 1200 can re-initiate the download at 1220. Otherwise, method 1200 proceeds to 1224 where the network records and billing function is updated to reflect the 'HD' N-Set value, and the re-evaluation process can terminate.

Figure 13:
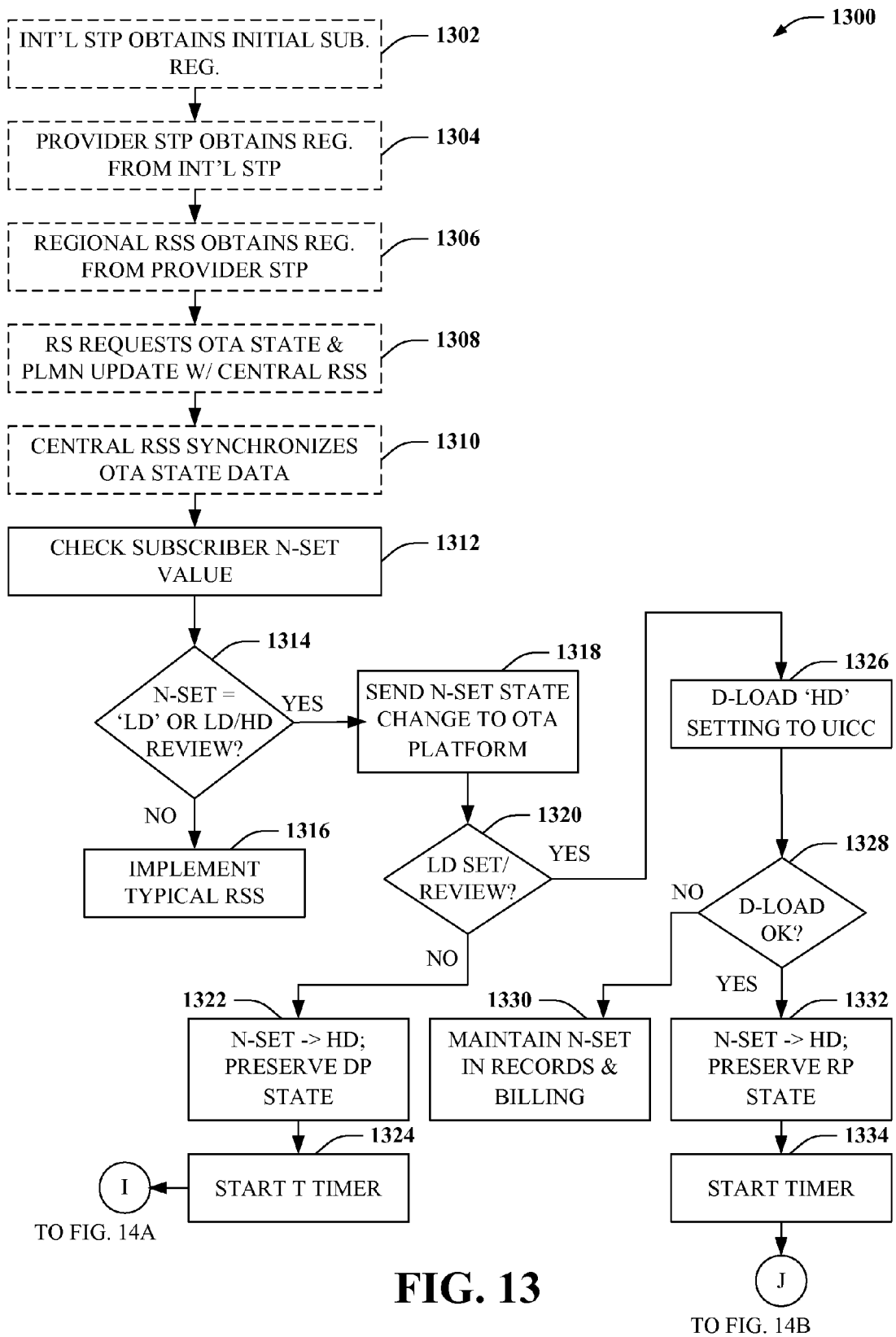
FIGS. 13 and 14A/14B depict a flowchart of an example methodology for tracking usage data to determine network selection according to still other aspects.

FIG. 13 depicts a flowchart of an example methodology 1300 for RSS processing in accordance with aspects of the subject disclosure. Reference numbers 1302 through 1310 are optionally implemented as part of methodology 1300, as indicated by the dashed lines in the figure. At 1302, method 1300 can optionally obtain an initial registration from a roaming subscriber at an international Service platform Trigger Point (STP). At 1304, method 1300 can optionally obtain the initial registration from the international STP at an operator's gateway STP. At 1306, method 1300 can optionally obtain the initial registration at a regional RSS from the operator's gateway STP. At 1308, method 1300 can optionally request subscriber OTA state information and send a public land mobile network (PLMN) identifier update request to a central RSS. At 1310, method 1300 can optionally synchronize subscriber OTA state information at the central RSS.

At 1310, method 1300 can check a current N-Set value for the roaming subscriber. At 1312, a determination is made as to whether the N-Set value is set to 'LD' or 'LD' or 'HD' review. If not, method 1300 can proceed to 1316, where typical RSS provisioning is implemented for the roaming subscriber. If the N-Set value is set to 'LD' or 'LD'/'HD' review, method 1300 can proceed to 1318 where an N-Set state change request is sent to a platform managing N-Set determination for the roaming subscriber, requesting the N-Set value be set to 'HD' or a default network for the mobile terminal. At 1320, method 1300 can determine whether the N-Set value for the mobile terminal is set to 'LD' or review. If not, method 1300 proceeds to 1322 where the N-Set value is set to 'HD' or a network default, and any service usage determination period is maintained in a current state. At 1324, a roaming timer can be set to maintain the 'HD' or network default N-Set value. Method 1300 can then proceed to FIG. 14A at 1402A.

If the determination at reference number 1320 indicates that the N-Set value for the roaming subscriber is set to 'LD' or 'LD' review, method 1300 can proceed to 1326, where an N-Set value of 'HD', or a manufacturer network selection default, is downloaded to a UICC-D of the mobile terminal. At 1328, a determination is made as to whether confirmation of the download is obtained. If not, method 1300 can proceed to 1330 where a current N-Set value is maintained in the network records and billing function. Otherwise, method 1300 can proceed to 1332, where the N-Set value is updated to 'HD' at the network records and billing function, and any service usage re-evaluation period state is maintained. At 1334, a roaming subscriber timer is set, and method 1300 can proceed to FIG. 14B at 1402B.

Figure 14A:
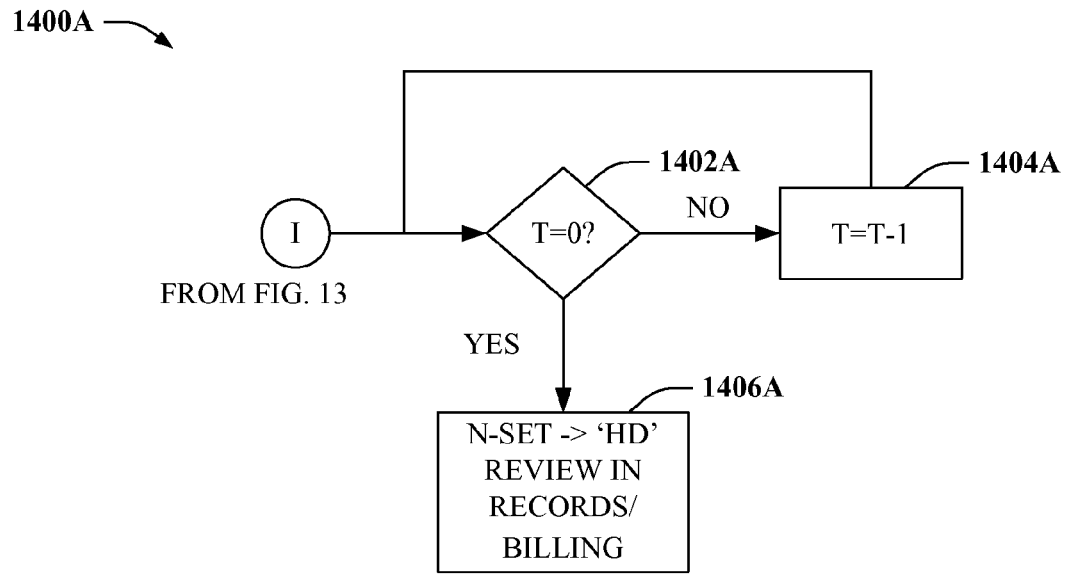
Figure 14B:
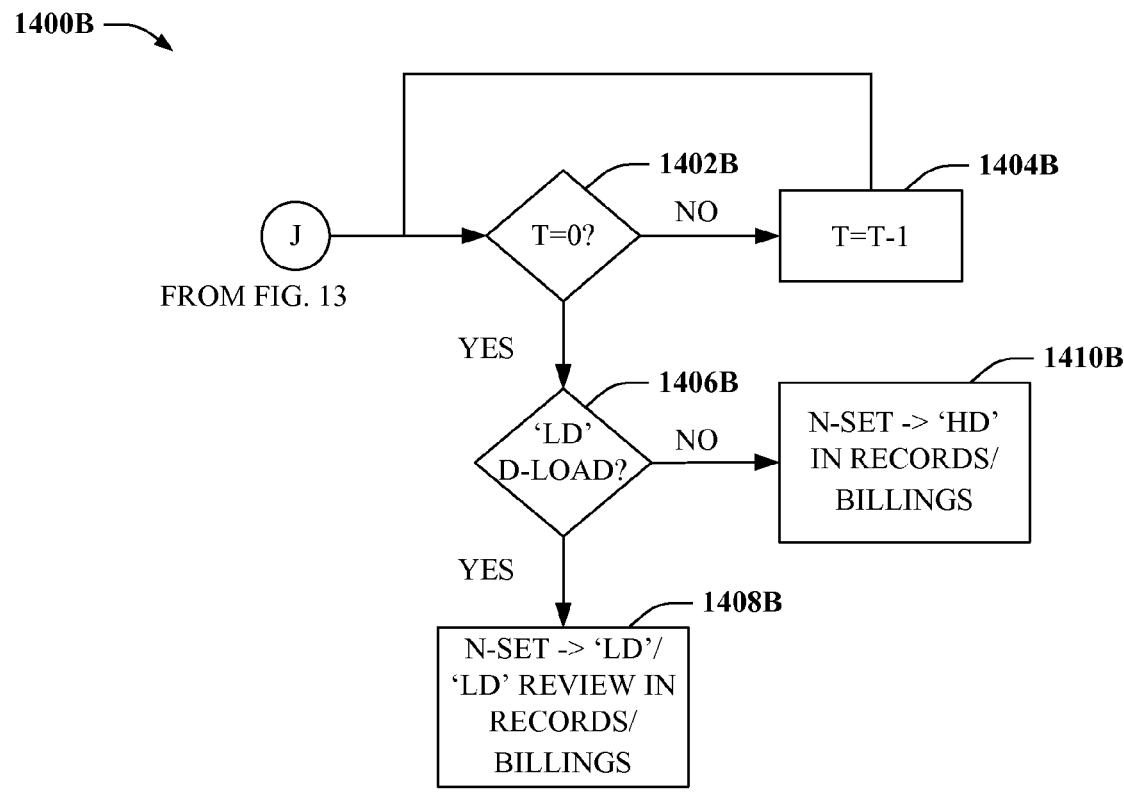

FIGS. 14A and 14B depict flowcharts of example methodologies 1400A, 1400B continuing N-Set provisioning for roaming subscribers from methodology 1300, supra. Methodology 1400A continues from method 1300 at 1324. At 1402A, method 1400A can make a determination as to whether a roaming timer parameter T is expired at zero. If not, method 1400A can proceed to 1404A, where the roaming timer parameter T is decremented and method 1400A returns to 1402A. At 1406A, if the roaming timer parameter T has expired at zero, method 1400A can update the network records and billing function to an N-Set value of 'HD' review, and terminate.

Methodology 1400B continues from method 1300 at 1334. At 1402B, method 1400B can determine whether the roaming timer parameter T is expired at zero. If not, method 1400B can proceed to 1404B, where the timer parameter T is decremented and method 1400B returns to 1402B. If the timer parameter T has expired to zero, method 1400B can proceed to 1406B. At 1406B, method 1400B can determine whether an N-Set value of 'LD' has been downloaded to the mobile terminal. If the N-Set value of 'LD' has been downloaded to the mobile terminal, method 1400B proceeds to 1408B, where the network records and billing function is updated to an N-Set value of 'LD' or 'LD' review, and re-evaluation can proceed as described herein. Otherwise, method 1400B proceeds to 1410B, where an N-Set value of 'HD' is updated to the network records and billing function and method 1400B terminates.

Figure 15:
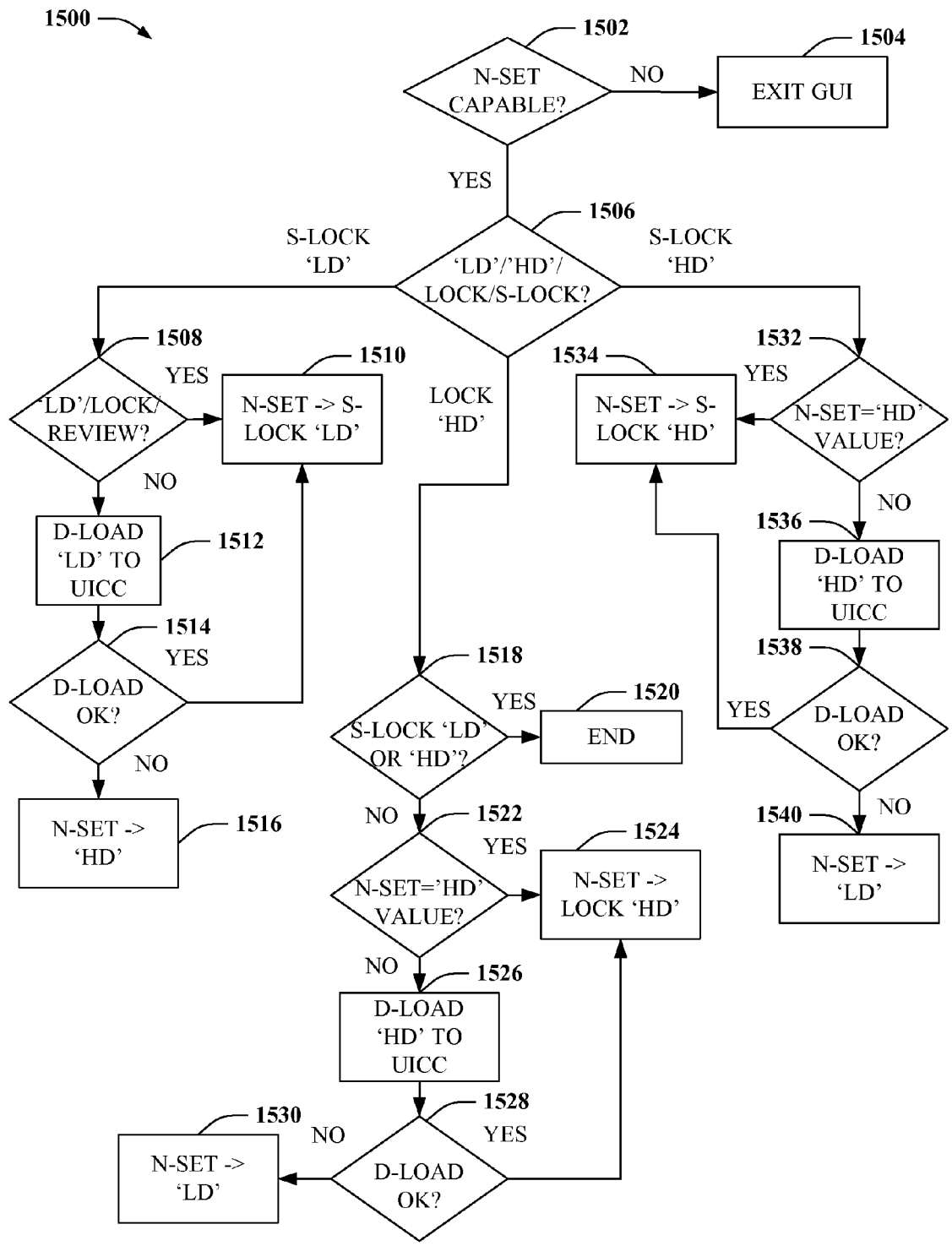
FIG. 15 depicts a flowchart of an example methodology for implementing network selection by an authorized user according to still other aspects disclosed herein.

FIG. 15 depicts a flowchart of an example methodology 1500 for providing user input for locking network selection according to aspects of the subject disclosure. At 1502, a determination is made as to whether a mobile terminal is N-Set capable. If not, method 1500 proceeds to 1504, where the manual interface process is terminated. Otherwise, method 1500 can proceed to 1506. At 1506, method 1500 can determine whether an N-Set input value of 'LD' super-lock, 'HD' lock or 'HD' super-lock is obtained (e.g., via a customer service interface). If an 'LD' super-lock input is obtained, method 1500 can proceed to 1508. If, on the other hand, an 'HD' lock input is obtained, method 1500 can proceed to 1518. Otherwise, if an 'HD' super-lock input is obtained, method 1500 proceeds to 1532.

At 1508, method 1500 can determine whether a current N-Set value of the mobile terminal is set to 'LD', 'LD' lock or 'LD' review. If so, method 1500 proceeds to 1510, where the N-Set value is updated to 'LD' super-lock in accordance with the obtained input. Otherwise, method 1500 can proceed to 1512, where an N-Set value of 'LD' is downloaded to a UICC-D of the mobile terminal. At 1514, a determination is made as to whether the download is confirmed by the mobile terminal. If confirmation is obtained, method 1500 proceeds to 1510; otherwise method 1500 can proceed to 1516, where an N-Set value of 'HD' is updated to the network records and billing function, and any service usage determination period is terminated.

At 1518, method 1500 can determine whether an N-Set value for the mobile terminal is set to 'LD' super-lock or 'HD', based on a 'HD' lock input obtained at reference number 1506. If so, method 1520 terminates at 1520. Otherwise, method 1500 can proceed to 1522, where a determination is made as to whether the N-Set value is 'HD'. If so, method 1500 proceeds to 1524 where the network records and billing function is updated with an 'HD' lock value. Otherwise, method 1500 proceeds to 1526 where an N-Set value of 'HD' is downloaded to the UICC-D of the mobile terminal. At 1528, a determination is made as to whether the download is confirmed by the mobile terminal. If so, method 1500 proceeds to 1524. Otherwise, method 1500 can proceed to 1530 where the network records and billing function is updated to an N-Set value of 'LD' for the mobile terminal.

At 1532, method 1500 can determine whether an N-Set value of the mobile terminal is set to 'HD' based on receiving the 'HD' super-lock input at reference number 1506. If so, method 1500 proceeds to 1534 where the network records and billing function is updated with an N-Set value of 'HD' super-lock for the mobile terminal. Otherwise, method 1500 can proceed to 1536, where an N-Set value of 'HD' is downloaded to the UICC-D of the mobile terminal. At 1538, a determination can be made as to whether a confirmation of the download is obtained from the mobile terminal. If so, method 1500 can proceed to 1534; otherwise, method 1500 proceeds to 1540, where the network records and billing function is updated with an N-Set value of 'LD' for the mobile terminal.

Figure 16:
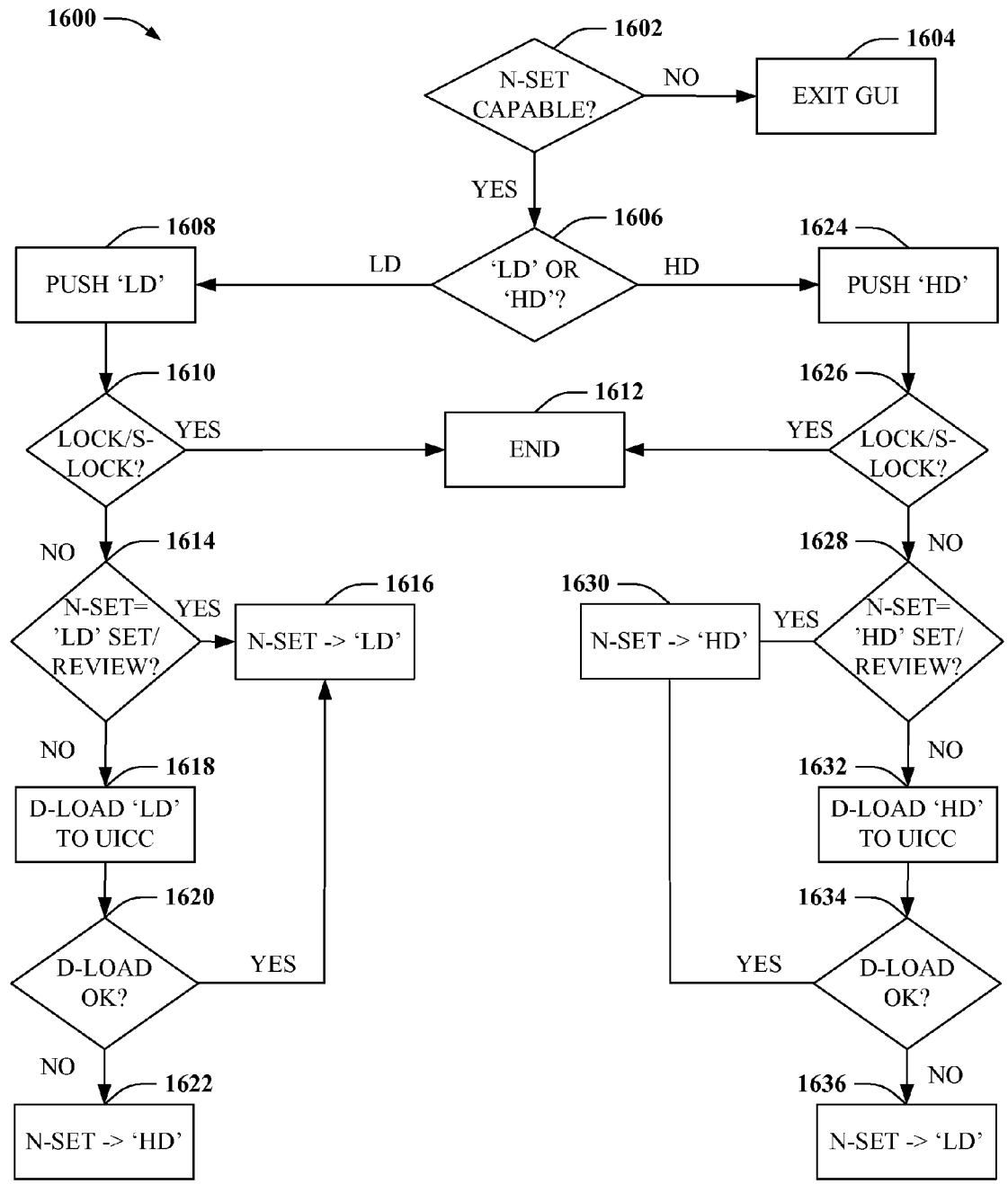
FIG. 16 illustrates a flowchart of a sample methodology for establishing a network as a default for a user terminal based on authorized user input.

FIG. 16 depicts a flowchart of a methodology 1600 for implementing network selection for a mobile terminal based on user input. At 1602, method 1600 can determine whether the mobile terminal is N-Set capable. If so, method 1600 can proceed to 1606; otherwise, method 1600 terminates at 1604. At 1606, method 1600 can determine whether a network selection of 'LD' or 'HD' is obtained as a result of user input. If an input of 'LD' is obtained, method 1600 proceeds to 1608; otherwise method 1600 proceeds to 1624 if an input of 'HD' is obtained.

At 1608, method 1600 can initialize pushing the 'LD' input to the mobile device. At 1610, method 1600 can determine whether an N-Set value for the mobile terminal is locked or super-locked. If so, method 1600 terminates at 1612. Otherwise, method 1600 can proceed to 1614. At 1614, method 1600 can determine whether the N-Set value is set to 'LD' or 'LD' review. If so, method 1600 proceeds to 1600 where an N-Set value in the network records and billing function is updated to 'LD'. Otherwise, method 1600 proceeds to 1618, where an N-Set value of 'LD' is downloaded to the UICC-D of the mobile terminal. At 1620, a determination is made as to whether a confirmation of the download is obtained from the mobile terminal. If so, method 1600 proceeds to 1616. Otherwise, method 1600 can update the network records and billing function to an N-Set value of 'HD' for the mobile terminal.

At 1624, method 1600 can initialize a pushing an 'HD' input to the mobile device, based on obtaining an 'HD' network selection input at reference number 1606. At 1626, method 1600 can determine whether the N-Set value for the mobile terminal is locked or super-locked. If so, method 1600 terminates at 1612. Otherwise, method 1600 can proceed to 1628, where a determination is made as to whether an N-Set value of 'HD' or 'HD' review is set for the mobile terminal. If so, method 1600 proceeds to 1630 where the network records and billing function is updated to reflect an N-Set value of 'HD'. Otherwise, method 1600 proceeds to 1632, where an N-Set value of 'HD' is downloaded to the UICC-D of the mobile terminal. At 1634, a determination is made as to whether a download confirmation is obtained from the mobile terminal. If so, method 1600 proceeds to 1630. Otherwise, method 1600 can update the network records and billing function with an N-Set value of 'LD'.

Figure 17:
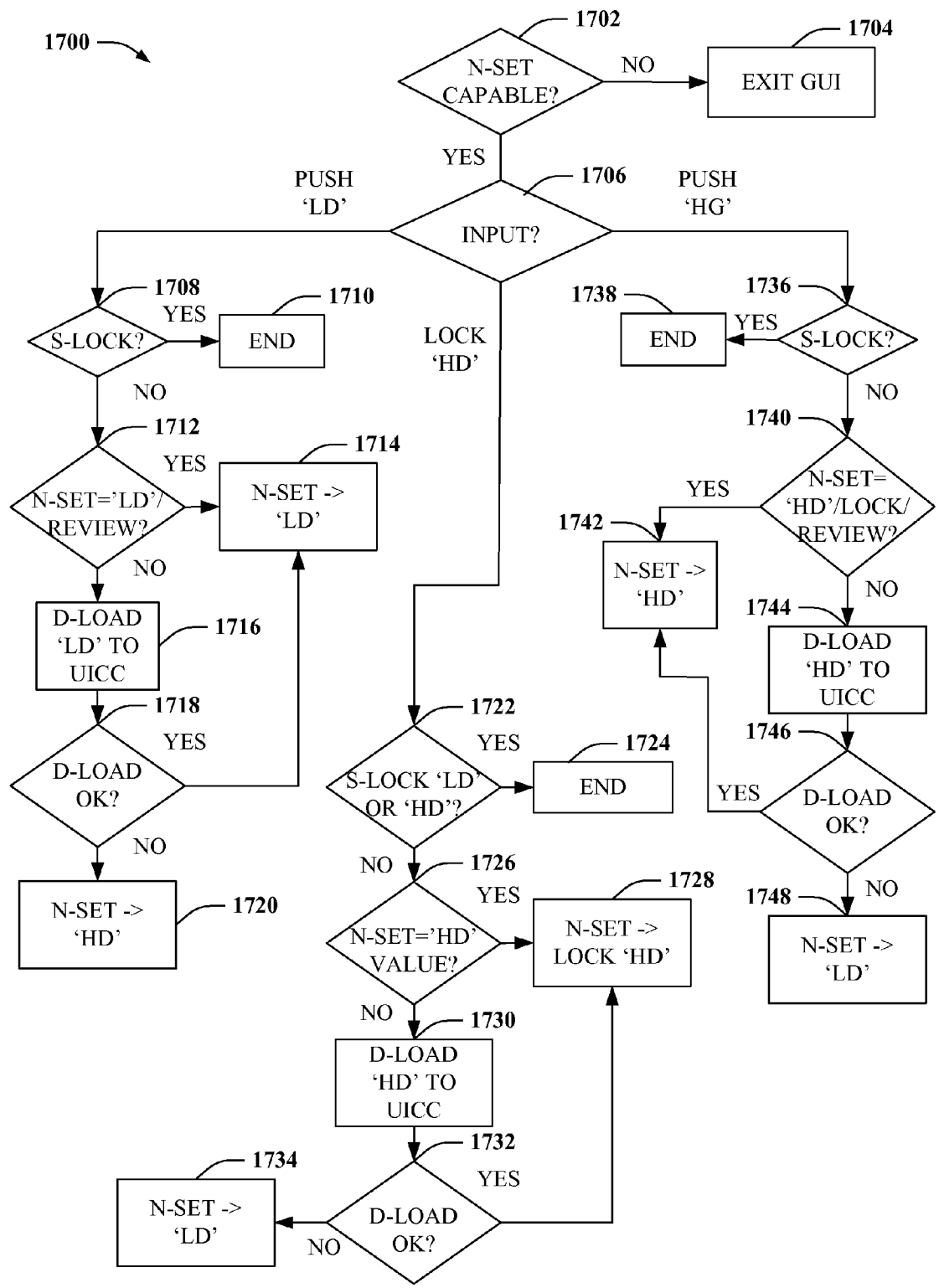
FIG. 17 illustrates a flowchart of another example methodology for establishing a network as a default for a user terminal based on authorized user input.

FIG. 17 depicts a flowchart of a sample methodology 1700 for enabling user input for mobile terminal network selection or locking network selection to a default 'HD' value. At 1702, method 1700 can determine whether the mobile terminal is N-Set capable. If not, method 1700 terminates at 1704; otherwise method 1700 can proceed to 1706. At 1706, method 1700 determines whether a user input is obtained. If an 'LD' input is obtained, method 1700 proceeds to 1708. If, instead, a lock 'HD' input is obtained, method 1700 can proceed to 1722. Otherwise, method 1700 proceeds to 1736 upon obtaining a 'HD' input.

At 1708, method 1700 can determine whether the N-Set value for the mobile terminal is set to super lock. If so, method 1700 terminates at 1710. Otherwise, method 1700 can proceed to 1712, where a determination is made as to whether the N-Set value is set to 'LD' or 'LD' review. If so, method 1700 can update the network records and billing function with an N-Set value of 'LD' for the mobile terminal. Otherwise, method 1700 can proceed to 1716. At 1716, method 1700 can download an N-Set value of 'LD' to a UICC-D of the mobile terminal. At 1718, method 1700 can determine whether a download confirmation is obtained from the mobile terminal. If so, method 1700 proceeds to 1714. Otherwise, method 1700 can update the network records and billing function with an N-Set value of 'HD'.

At 1722, method 1700 can determine whether the N-Set value for the mobile terminal is set to 'LD' super-lock or 'HD', based on obtaining a lock 'HD' input at reference number 1706. If so, method 1700 terminates at 1724. Otherwise, method 1700 can proceed to 1726 where a determination is made as to whether the N-Set value for the mobile terminal is set to 'HD'. If so, method 1700 can update the network records and billing function with an N-Set value of 'HD' lock at 1728. Otherwise, method 1700 proceeds to 1730 and downloads an N-Set value of 'HD' to the mobile terminal. At 1732, a determination is made as to whether a download confirmation is obtained form the mobile terminal. If so, method 1700 can proceed to 1728. Otherwise, method 1700 updates the network records and billing function to an N-Set value of 'LD' at 1734.

At 1736, method 1700 can determine whether an N-Set value for the mobile terminal is super-locked, based on obtaining an 'HD' input at reference number 1706. If so, method 1700 terminates at 1738. Otherwise, method 1700 can proceed to 1740. At 1740, method 1700 can determine whether the N-Set value is 'HD', 'HD' lock or 'HD' review. If so, method 1700 proceeds to 1742, where the network records and billing function is updated with an N-Set value of 'HD'. Otherwise, method 1700 can proceed to 1744, where an N-Set value of 'HD' is downloaded to a UICC-D of the mobile terminal. At 1746, method 1700 can determine whether a download confirmation is obtained from the mobile terminal. If so, method 1700 proceeds to 1742. Otherwise, method 1700 can update the network records and billing function with an N-Set value of 'LD'.

Figure 18:
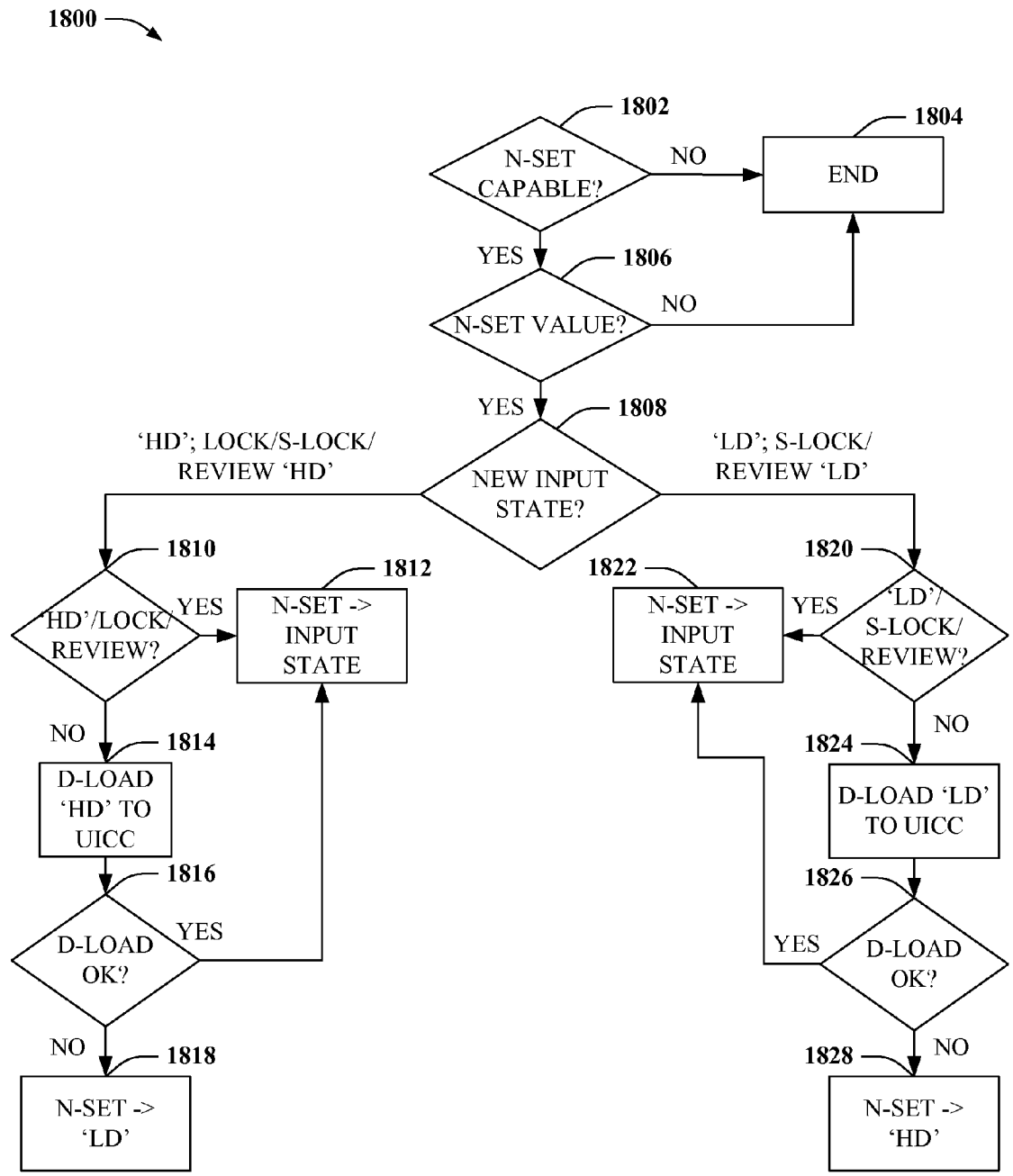
FIG. 18 depicts a flowchart of a sample methodology for employing authorized user input to lock network-selection according to additional aspects.

FIG. 18 depicts a flowchart of an example methodology 1800 providing a high-level customer support interface to network selection for a mobile terminal. The high level support can enable a user to override existing N-Set values, including lock or super-lock values. At 1802, method 1800 can determine whether the mobile terminal is N-Set capable. If not, method 1800 terminates at 1804. Otherwise, method 1800 can proceed to 1806, where a determination is made as to whether an existing N-Set block is initialized for a subscriber associated with the mobile terminal. If not, method 1800 terminates at 1804; otherwise method 1800 can proceed to 1808.

At 1808, method 1800 can analyze a new input from an input interface. If the new input comprises an N-Set value of 'HD', 'HD' lock, 'HD' super-lock or 'HD' review, method 1800 proceeds to 1810. Otherwise, if the new input comprises an N-Set value of 'LD', 'LD' super-lock or 'LD' review, method 1800 can proceed to 1820.

At 1810, method 1800 determines whether an N-Set value for the mobile terminal is currently set to 'HD', 'HD' lock or 'HD' review. If so, method 1800 updates the network records and billing function with an N-Set value corresponding to the new 'HD'-related user input. Otherwise, method 1800 proceeds to 1814, where an N-Set value of 'HD' is downloaded to a UICC-D of the mobile terminal. At 1816, method 1800 can determine whether a download confirmation is obtained from the mobile terminal. If so, method 1800 proceeds to 1812. Otherwise, method 1800 can proceed to 1818, where the network records and billing function is updated with an N-Set value of 'LD'.

At 1820, method 1800 can determine whether an N-Set value of the mobile terminal is set to 'LD', 'LD' super-lock, or 'LD' review, based on obtaining an 'LD'-related input at reference number 1808. If so, method 1800 proceeds to 1822 where the network records and billing function is updated with an N-Set value corresponding with the 'LD'-related user input. Otherwise, method 1800 proceeds to 1824. At 1824, method 1800 can download an 'LD' N-Set value to the UICC-D of the mobile terminal. At 1826, method 1800 can determine whether a download confirmation is obtained from the mobile terminal. If so, method 1800 proceeds to 1822. Otherwise, method 1800 can proceed to 1828, where the network records and billing function is updated with an N-Set value of 'HD' for the mobile terminal.

Figure 19:
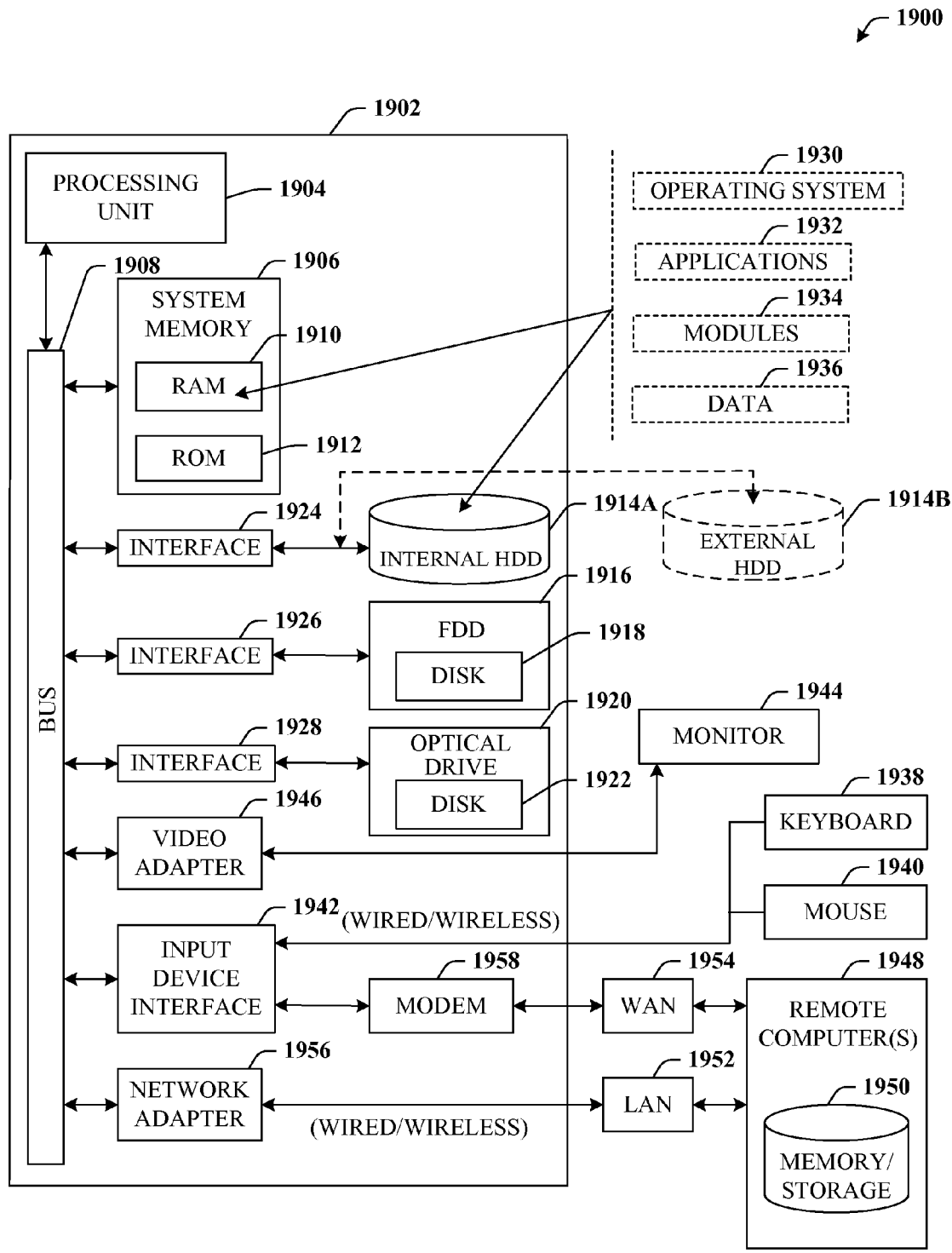
FIG. 19 illustrates a block diagram of an example operating environment suitable for storing data and implementing determinations described herein.

Referring now to FIG. 19, there is illustrated a block diagram of an exemplary computer system operable to execute aspects of the subject disclosure. In order to provide additional context for various aspects of the claimed subject matter, FIG. 19 and the following discussion are intended to provide a brief, general description of a suitable computing environment 1900 in which the various aspects of the claimed subject matter can be implemented. Additionally, while the claimed subject matter described above can be suitable for application in the general context of computer-executable instructions that can run on one or more computers, the claimed subject matter also can be implemented in combination with other program modules and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the above should also be included within the scope of computer-readable media.

Continuing to reference FIG. 19, the exemplary environment 1900 for implementing various aspects of the claimed subject matter includes a computer 1902, the computer 1902 including a processing unit 1904, a system memory 1906 and a system bus 1908. The system bus 1908 couples to system components including, but not limited to, the system memory 1906 to the processing unit 1904. The processing unit 1904 can be any of various commercially available processors. Dual or quad microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes read-only memory (ROM) 1910 and random access memory (RAM) 1912. A basic input/output system (BIOS) is stored in a non-volatile memory 1910 such as ROM, EPROM, EEPROM, which BIOS contains the basic routines that help to transfer information between elements within the computer 1902, such as during start-up. The RAM 1912 can also include a high-speed RAM such as static RAM for caching data.

The computer 1902 further includes an internal hard disk drive (HDD) 1914A (e.g., EIDE, SATA), which internal hard disk drive 1914A can also be configured for external use (1014B) in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the claimed subject matter.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. It is appreciated that the claimed subject matter can be implemented with various commercially available operating systems or combinations of operating systems.

A user can enter commands and information into the computer 1902 through one or more wired/wireless input devices, e.g., a keyboard 1938 and a pointing device, such as a mouse 1940. Other input devices (not shown) can include a microphone, an IR remote control, a joystick, a game pad, a stylus pen, touch screen, or the like. These and other input devices are often connected to the processing unit 1904 through an input device interface 1942 that is coupled to the system bus 1908, but can be connected by other interfaces, such as a parallel port, an IEEE1394 serial port, a game port, a USB port, an IR interface, etc.

A monitor 1944 or other type of display device is also connected to the system bus 1908 via an interface, such as a video adapter 1946. In addition to the monitor 1944, a computer typically includes other peripheral output devices (not shown), such as speakers, printers, etc.

The computer 1902 can operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 is connected to the local network 1952 through a wired and/or wireless communication network interface or adapter 1956. The adapter 1956 can facilitate wired or wireless communication to the LAN 1952, which can also include a wireless access point disposed thereon for communicating with the wireless adapter 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wired or wireless device, is connected to the system bus 1908 via the serial port interface 1942. In a networked environment, program modules depicted relative to the computer 1902, or portions thereof, can be stored in the remote memory/storage device 1950. It will be appreciated that the network connections shown are exemplary and other means of establishing a communications link between the computers can be used.

The computer 1902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE802.11 (a, b, g, n, etc.) to provide secure, reliable, fast wireless connectivity. A WiFi network can be used to connect computers to each other, to the Internet, and to wired networks (which use IEEE802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 19 BaseT wired Ethernet networks used in many offices.

Figure 20:
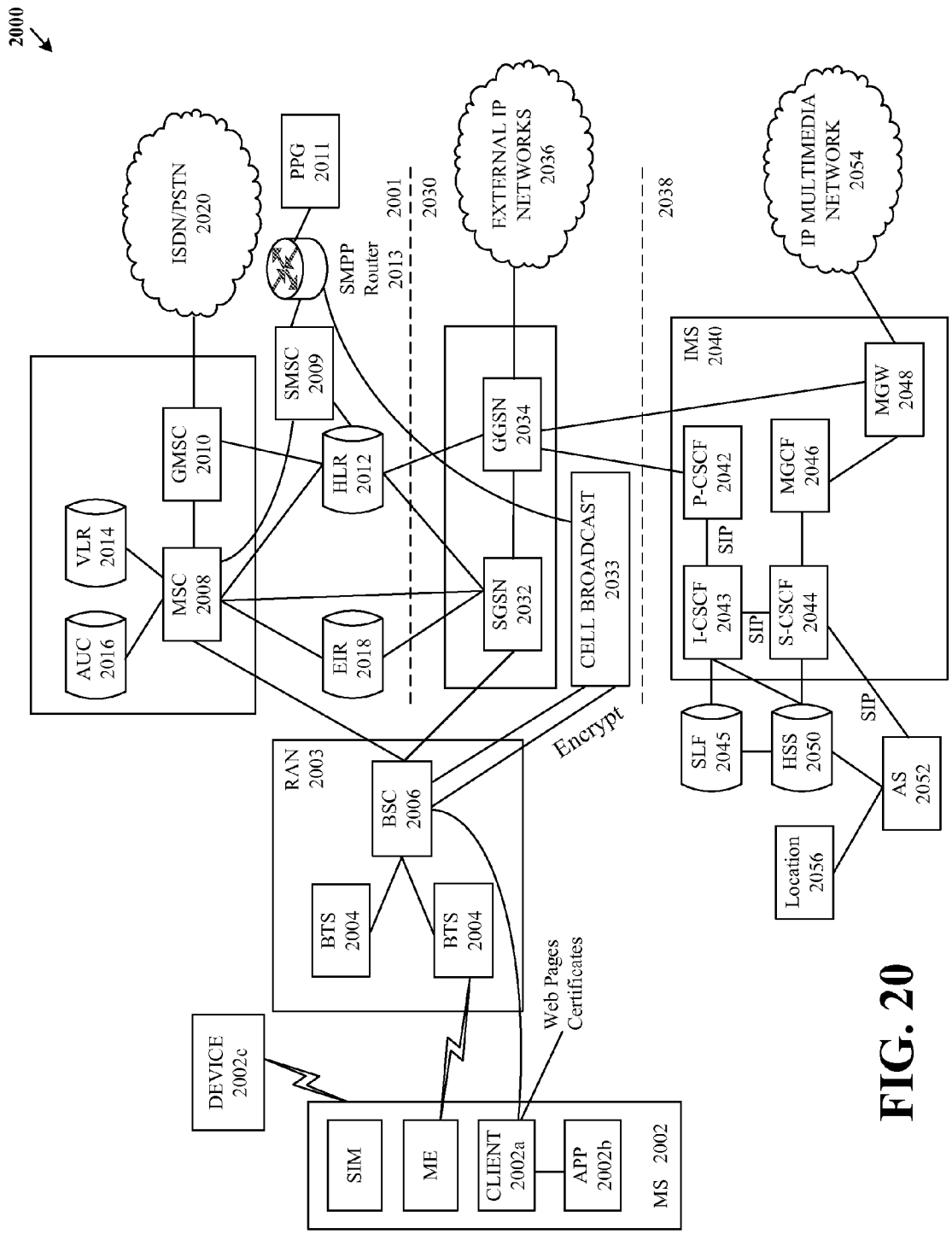
FIG. 20 depicts a block diagram of a sample networking environment for providing remote mobile communication between wireless devices.

Now turning to FIG. 20, such figure depicts a GSM/GPRS/IP multimedia network architecture 2000 that includes a GSM core network 2001, a GPRS network 2030 and an IP multimedia network 2038. The GSM core network 2001 includes a Mobile Station (MS) 2002, at least one Base Transceiver Station (BTS) 2004 and a Base Station Controller (BSC) 2006. The MS 2002 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 2002 includes an embedded client 2002*a* that receives and processes messages received by the MS 2002. The embedded client 2002*a* can be implemented in JAVA and is discuss more fully below.

The embedded client 2002*a* communicates with an application 2002*b* that provides services and/or information to an end user. One example of the application can be navigation software that provides near real-time traffic information that is received via the embedded client 2002*a* to the end user. The navigation software can provide road conditions, suggest alternate routes, etc. based on the location of the MS 2002. Those of ordinary skill in the art understand that there are many different methods and systems of locating an MS 2002.

Alternatively, the MS 2002 and a device 2002c can be enabled to communicate via a short-range wireless communication link, such as BLUETOOTH. For example, a BLUETOOTH SIM Access Profile can be provided in an automobile (e.g., device 2002c) that communicates with the SIM in the MS 2002 to enable the automobile's communications system to pull information from the MS 2002. The BLUETOOTH communication system in the vehicle becomes an "embedded phone" that employs an antenna associated with the automobile. The result is improved reception of calls made in the vehicle. As one of ordinary skill in the art would recognize, an automobile is one example of the device 2002c. There can be an endless number of devices 2002c that use the SIM within the MS 2002 to provide services, information, data, audio, video, etc. to end users.

The BTS 2004 is physical equipment, such as a radio tower, that enables a radio interface to communicate with the MS. Each BTS can serve more than one MS. The BSC 2006 manages radio resources, including the BTS. The BSC can be connected to several BTSs. The BSC and BTS components, in combination, are generally referred to as a base station (BSS) or radio access network (RAN) 2003.

The GSM core network 2001 also includes a Mobile Switching Center (MSC) 2008, a Gateway Mobile Switching Center (GMSC) 2010, a Home Location Register (HLR) 2012, Visitor Location Register (VLR) 2014, an Authentication Center (AuC) 2018, and an Equipment Identity Register (EIR) 2016. The MSC 2008 performs a switching function for the network. The MSC also performs other functions, such as registration, authentication, location updating, handovers, and call routing. The GMSC 2010 provides a gateway between the GSM network and other networks, such as an Integrated Services Digital Network (ISDN) or Public Switched Telephone Networks (PSTNs) 2020. In other words, the GMSC 2010 provides interworking functionality with external networks.

The HLR 2012 is a database or component(s) that comprises administrative information regarding each subscriber registered in a corresponding GSM network. The HLR 2012 also includes the current location of each MS. The VLR 2014 is a database or component(s) that includes selected administrative information from the HLR 2012. The VLR includes information necessary for call control and provision of subscribed services for each MS currently located in a geographical area controlled by the VLR. The HLR 2012 and the VLR 2014, together with the MSC 2008, provide the call routing and roaming capabilities of GSM. The AuC 2016 provides the parameters needed for authentication and encryption functions. Such parameters allow verification of a subscriber's identity. The EIR 2018 stores security-sensitive information about the mobile equipment.

A Short Message Service Center (SMSC) 2009 allows one-to-one Short Message Service (SMS) messages to be sent to/from the MS 2002. A Push Proxy Gateway (PPG) 2011 is used to "push" (e.g., send without a synchronous request) content to the MS 2002. The PPG 2011 acts as a proxy between wired and wireless networks to facilitate pushing of data to the MS 2002. A Short Message Peer to Peer (SMPP) protocol router 2013 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 2002 sends a location update including its current location information to the MSC/VLR, via the BTS 2004 and the BSC 2006. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 2030 is logically implemented on the GSM core network architecture by introducing two packet-switching network nodes, a serving GPRS support node (SGSN) 2032, a cell broadcast and a Gateway GPRS support node (GGSN) 2034. The SGSN 2032 is at the same hierarchical level as the MSC 2008 in the GSM network. The SGSN controls the connection between the GPRS network and the MS 2002. The SGSN also keeps track of individual MS's locations and security functions and access controls.

A Cell Broadcast Center (CBC) 2033 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 2034 provides a gateway between the GPRS network and a public packet network (PDN) or other IP networks 2036. That is, the GGSN provides interworking functionality with external networks, and sets up a logical link to the MS through the SGSN. When packet-switched data leaves the GPRS network, it is transferred to an external TCP-IP network 2036, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 2030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel.

In a NOM3 network, a MS can monitor pages for a circuit switched network while received data and vise versa.

The IP multimedia network 2038 was introduced with 3GPP Release 5, and includes an IP multimedia subsystem (IMS) 2040 to provide rich multimedia services to end users. A representative set of the network entities within the IMS 2040 are a call/session control function (CSCF), a media gateway control function (MGCF) 2046, a media gateway (MGW) 2048, and a master subscriber database, called a home subscriber server (HSS) 2050. The HSS 2050 can be common to the GSM network 2001, the GPRS network 2030 as well as the IP multimedia network 2038.

The IP multimedia system 2040 is built around the call/session control function, of which there are three types: an interrogating CSCF (I-CSCF) 2043, a proxy CSCF (P-CSCF) 2042, and a serving CSCF (S-CSCF) 2044. The P-CSCF 2042 is the MS's first point of contact with the IMS 2040. The P-CSCF 2042 forwards session initiation protocol (SIP) messages received from the MS to an SIP server in a home network (and vice versa) of the MS. The P-CSCF 2042 can also modify an outgoing request according to a set of rules defined by the network operator (for example, address analysis and potential modification).

The I-CSCF 2043 forms an entrance to a home network and hides the inner topology of the home network from other networks and provides flexibility for selecting an S-CSCF. The I-CSCF 2043 can contact a subscriber location function (SLF) 2045 to determine which HSS 2050 to use for the particular subscriber, if multiple HSS's 2050 are present. The S-CSCF 2044 performs the session control services for the MS 2002. This includes routing originating sessions to external networks and routing terminating sessions to visited networks. The S-CSCF 2044 also decides whether an application server (AS) 2052 is required to receive information on an incoming SIP session request to ensure appropriate service handling. This decision is based on information received from the HSS 2050 (or other sources, such as an application server 2052). The AS 2052 also communicates to a location server 2056 (e.g., a Gateway Mobile Location Center (GMLC)) that provides a position (e.g., latitude/longitude coordinates) of the MS 2002.

The HSS 2050 includes a subscriber profile and keeps track of which core network node is currently handling the subscriber. It also supports subscriber authentication and authorization functions (AAA). In networks with more than one HSS 2050, a subscriber location function provides information on the HSS 2050 that includes the profile of a given subscriber.

The MGCF 2046 provides interworking functionality between SIP session control signaling from the IMS 2040 and ISUP/BICC call control signaling from the external GSTN networks (not shown). It also controls the media gateway (MGW) 2048 that provides user-plane inter-working functionality (e.g., converting between AMR- and PCM-coded voice). The MGW 2048 also communicates with other IP multimedia networks 2054.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that provides load balancing for wireless communications, comprising:
    memory storing computer-executable instructions and residing within a component of a network;
    processor, communicatively coupled to the memory and residing at least in part within the component of the network, that facilitates execution of the computer-executable instructions to at least:
    qualify a mobile terminal for an inter-network selection procedure that overrides a pre-programmed terminal-initiated network selection protocol of the mobile terminal in response to satisfaction of a qualification criterion by the mobile terminal, wherein the qualification criterion is derived from a combination of a multi-mode capability of the mobile terminal, existence of data-related services on a subscriber account associated with the mobile terminal, and presence of the mobile terminal within a geographic region in which a first mobile network and a second mobile network satisfy a loading condition related to terminal load disparity of the first mobile network and the second mobile network;
    initiate a data usage evaluation period in response to the mobile terminal qualifying for the inter-network selection, wherein the data usage evaluation period is at least five days in duration;
    monitor data usage of the mobile terminal over the data usage evaluation period;
    compile a total data usage quantity consumed by data-related transmissions of the mobile terminal during the data usage evaluation period;
    terminate the data usage evaluation period upon expiration of the duration;
    compare the total data usage quantity with a target data usage quantity, wherein the target data usage quantity is a function at least of a terminal loading parameter of the first mobile network or the second mobile network; and
    establish the first mobile network as a default network for voice and data traffic of the mobile terminal in response to the total data usage quantity satisfying a condition, the condition being defined by a function related to the target data usage quantity, wherein the first mobile network has a lower maximum data rate than the second mobile network.

2. The system of claim 1, wherein satisfaction of the loading condition occurs in response to the first mobile network satisfying an under-utilization condition.

3. The system of claim 1, wherein the at least one processor further facilitates the execution of the computer-executable instructions to store data indicating whether the mobile terminal is compatible with both the first mobile network and the second mobile network, wherein such indication is determinative of the multi-mode capability of the mobile terminal.

4. The system of claim 1, wherein the at least one processor further facilitates the execution of the computer-executable instructions to store data indicating a mobile network preference at least for the first mobile network as pertains to terminal-initiated network selection functions of the mobile terminal, wherein the qualification criterion is further based at least in part on the mobile network preference not rejecting the first mobile network.

5. The system of claim 1, wherein the data-related services comprises a service that is adapted to a characteristic of the second mobile network.

6. The system of claim 1, wherein the at least one processor further facilitates the execution of the computer-executable instructions to determine a current terminal load for the first mobile network, and employ the current terminal load as an additional condition for directing the mobile terminal to the first mobile network.

7. The system of claim 1, wherein the at least one processor further facilitates the execution of the computer-executable instructions to provide the mobile terminal with data establishing the first mobile network as a default for terminal-initiated network selection decisions as part of establishing the first mobile network as the default network for both voice and data traffic of the mobile terminal, wherein the data causes the mobile terminal to acquire the first mobile network in lieu of the second mobile network in response to a signal of the first mobile network satisfying a minimum quality criterion.

8. The system of claim 1, wherein the at least one processor further facilitates the execution of the computer-executable instructions to update a home location register (HLR) associated with the mobile terminal to associate the mobile terminal with the first mobile network in response to the system establishing the first mobile network as the default network for both voice and data traffic of the mobile terminal.

9. The system of claim 1, wherein the at least one processor further facilitates the execution of the computer-executable instructions to reference a network billing platform, and identify whether an associated rate plan restricts the mobile terminal to the second mobile network as part of determining satisfaction of the qualification criterion.

10. The system of claim 1, wherein the at least one processor further facilitates the execution of the computer-executable instructions to set the second mobile network as a default for terminal-directed network selection for the mobile terminal in response to the total data usage quantity not satisfying the condition.

11. The system of claim 1, wherein the at least one processor further facilitates the execution of the computer-executable instructions to receive user data input from the mobile terminal and facilitate overriding establishing the first mobile network as the default network for voice and data traffic of the mobile terminal in response to the received user data input.

12. The system of claim 1, wherein the at least one processor further facilitates the execution of the computer-executable instructions to receive user data input from an authorized device of a network of a service provider and lock the establishing of the first mobile network as the default network in response to the user data input to prevent the system from changing the default network absent a second contrary user data input from the authorized device.

13. A method for load balancing mobile terminals among mobile networks, comprising:
identifying, by a system located at least in part at a component of a wireless network and including at least one processor, whether a provisioning transaction has occurred with respect to a mobile terminal;
determining, by the system, whether the mobile terminal has a subscriber identity module card configured for a network pre-set function in response to occurrence of the provisioning transaction, wherein the network pre-set function causes the mobile terminal to acquire a first mobile network in favor of a second mobile network at least in part contrary to a manufacturer network acquisition protocol of the mobile terminal;
storing, by the system, a compatibility data record indicating compatibility of the mobile terminal with the network pre-set function in response to the subscriber identity module card being configured for the network pre-set function, and storing an incompatibility data record indicating incompatibility of the mobile terminal with the network pre-set function in response to the subscriber identity module card not being configured for the network pre-set function;
determining, by the system, whether the mobile terminal is in a market that supports the network pre-set function;
activating, by the system, the network pre-set function for the mobile terminal in response to the mobile terminal being in the market that supports the network pre-set function and deactivating, by the system, the network pre-set function for the mobile terminal in response to the mobile terminal not being in the market that supports then network pre-set function;
determining, by the system, whether an existing network pre-set value is assigned to the mobile terminal;
establishing, by the system, a network pre-set evaluation for the mobile terminal in response to the existing network pre-set value not being assigned to the mobile terminal;
initiating, by the system, data usage monitoring for the mobile terminal for a time period associated with the network pre-set evaluation;
terminating, by the system, the data usage monitoring for the mobile terminal in response to completion of the time period;
compiling, by the system, a data usage quantity for the mobile terminal over the time period, the data usage quantity indicative of a sum total of data resources consumed by the mobile terminal for the time period; and
downloading to the mobile terminal, by the system, a data record that causes the mobile terminal to acquire access to the first mobile network having a low data rate compared with the second mobile network for both voice and data traffic in a manner at least in part contrary to the manufacturer network acquisition protocol, in response to the data usage quantity satisfying a condition comprising the data usage quantity in relation to a target data consumption.

14. The method of claim 13, further comprising:
determining, by the system, load of the first mobile network relative to the second mobile network; and
conditioning, by the system, downloading the data record to the mobile terminal based on a threshold disparity in respective network load of the first mobile network and the second mobile network.

15. The method of claim 13, further comprising:
receiving, by the system, a user input pertaining to the network pre-set function;
authorizing, by the system, the user input; and
locking, by the system, the network pre-set function from changing the data record thereby preventing changes to the network pre-set function in response to successful authorization of the user input.

16. The method of claim 13, further comprising re-evaluating, by the system, the data usage quantity during a re-evaluation period;
deriving, by the system, a second data usage quantity for the re-evaluation period; and
updating, by the system, the network pre-set function in response to the second data usage satisfying a re-evaluation condition.

17. The method of claim 16, further comprising:
downloading, by the system, a second data record that causes the mobile terminal to acquire access to the second mobile network for both voice and data traffic in the manner at least in part contrary to the manufacturer network acquisition protocol in response to the second data usage not satisfying the re-evaluation condition.

18. The method of claim 13, further comprising determining, by the system, whether a subscription plan associated with the mobile terminal has packet-based data services associated with the subscription plan and deactivating, by the system, the network pre-set function for the mobile terminal in response to the packet-based data services being associated with the subscription plan.

19. A non-transitory computer-readable medium comprising computer-readable instructions that, in response to execution facilitated by a processor, cause a system including the processor and residing within a network to perform operations, comprising:

referencing a subscriber profile associated with a mobile terminal and determining whether the subscriber profile permits a network pre-set capability derived from data-related consumption of the mobile terminal, and initiating a usage evaluation period for quantifying the data-related consumption for the mobile terminal in response to the subscriber profile permitting the network pre-set capability;

monitoring a total data usage of the mobile terminal over the usage evaluation period;

deriving a quantity of data consumed by the mobile terminal for all data-related services utilized by the mobile terminal during the usage evaluation period;

setting a low data rate network of a set of mobile networks as a default access network for voice and data traffic of the mobile terminal in response to the quantity of data satisfying a condition defined by a function related to the usage evaluation period;

referencing a database of rate plan benefits associated with consumption-based network pre-set capability, identifying a matching benefit for which the mobile terminal qualifies in response to the subscriber profile permitting the consumption-based network pre-set capability and in response to setting the low data rate network as the default access network, and applying the matching benefit to a billing account associated with the mobile terminal;

monitoring further data usage of the mobile terminal over a usage re-evaluation period and deriving a second quantity of data consumed by the mobile terminal for all data-related services utilized by the mobile terminal during the usage re-evaluation period;

maintaining the low data rate network as the default access network for voice and data traffic of the mobile terminal in response to the second quantity of data satisfying a re-evaluation condition; and changing the default access network in response to the second quantity of data not satisfying the re-evaluation condition.

20. The non-transitory computer-readable medium of claim 19, the operations further comprising:

receiving a user input;

authorizing the user input; and locking the default access network for the mobile terminal from non-authorized user changes to the default access network in response to successful authorization of the user input.

\* \* \* \* \*